United States Patent
Freiin von Kapri et al.

(10) Patent No.: US 12,314,469 B2
(45) Date of Patent: May 27, 2025

(54) CONTENT MANIPULATION VIA A COMPUTER-GENERATED REPRESENTATION OF A TRACKPAD

(71) Applicant: Apple Inc., Cupertino, CA (US)

(72) Inventors: Anette L. Freiin von Kapri, Mountain View, CA (US); Aaron M. Burns, Sunnyvale, CA (US); Benjamin R. Blachnitzky, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/613,570

(22) Filed: Mar. 22, 2024

(65) Prior Publication Data
US 2024/0231486 A1 Jul. 11, 2024

Related U.S. Application Data

(63) Continuation of application No. PCT/US2022/043951, filed on Sep. 19, 2022.
(Continued)

(51) Int. Cl.
*G06F 3/01* (2006.01)
*G06F 3/0346* (2013.01)
(Continued)

(52) U.S. Cl.
CPC .............. *G06F 3/013* (2013.01); *G06F 3/017* (2013.01); *G06F 3/0346* (2013.01);
(Continued)

(58) Field of Classification Search
CPC ...... G06F 3/011; G06F 3/013; G06F 3/03547; G06F 3/04845; G06F 3/0486; G06F 2203/04807; G06V 40/10
See application file for complete search history.

(56) References Cited

U.S. PATENT DOCUMENTS 9,201,500 B2 * 12/2015 Srinivasan .............. G06F 3/013
10,317,989 B2 6/2019 Rouvinez et al.
(Continued)

OTHER PUBLICATIONS

Sunggeun Ahn et al., "Gaze-Assisted Typing for Smart Glasses," Proceedings of the 32nd annual ACM symposium on user interface software and technology. 2019.
(Continued)

*Primary Examiner* — Nitin Patel
*Assistant Examiner* — Cory A Almeida
(74) *Attorney, Agent, or Firm* — Fernando & Partners, LLP

(57) ABSTRACT

A method includes determining a first gaze position within a content manipulation region based on eye tracking data from an eye tracker. The method includes determining a selection point associated with a physical surface, based on spatial selector data from a spatial selector tracker. The method includes displaying a computer-generated representation of a trackpad on the physical surface, based on the first gaze position and the selection point. In some implementations, a method includes displaying a user interface including a plurality of content manipulation regions, a plurality of affordances respectively associated with the plurality of content manipulation regions, and a computer-generated representation of a trackpad. The method includes detecting, via a spatial selector tracker, an input directed to a first affordance associated with a first content manipulation region. The method includes associating the computer-generated representation of the trackpad with the first content manipulation region, based on the input.

21 Claims, 35 Drawing Sheets

Related U.S. Application Data

(60) Provisional application No. 63/247,924, filed on Sep. 24, 2021.

(51) Int. Cl.
*G06F 3/0354* (2013.01)
*G06F 3/038* (2013.01)
*G06F 3/04815* (2022.01)
*G06F 3/04845* (2022.01)
*G06F 3/0486* (2013.01)
*G06V 40/10* (2022.01)

(52) U.S. Cl.
CPC .......... *G06F 3/03547* (2013.01); *G06F 3/038* (2013.01); *G06F 3/04815* (2013.01); *G06F 3/04845* (2013.01); *G06F 3/0486* (2013.01); *G06V 40/10* (2022.01); *G06F 3/011* (2013.01); *G06F 2203/04807* (2013.01)

(56) References Cited

U.S. PATENT DOCUMENTS

| | | |
|---|---|---|
| 10,394,342 B2 | 8/2019 | Imm et al. |
| 11,054,896 B1* | 7/2021 | Wilytsch .............. G06F 3/04815 |
| 2020/0257362 A1* | 8/2020 | Wang ...................... G06F 3/011 |

OTHER PUBLICATIONS

PCT International Search Report and Written Opinion dated Feb. 23, 2023, PCT International Application No. PCT/US2022/043951, pp. 1-19.

* cited by examiner

CONTENT MANIPULATION VIA A COMPUTER-GENERATED REPRESENTATION OF A TRACKPAD

CROSS-REFERENCE TO RELATED APPLICATIONS

This application is a continuation of Intl. Patent App. No. PCT/US2022/043951, filed on Sep. 19, 2022, which claims priority to U.S. Provisional Patent App. No. 63/247,924, filed on Sep. 24, 2021, all of which are incorporated by reference in their entirety.

TECHNICAL FIELD

The present disclosure relates to content manipulation and, in particular, content manipulation based on an input directed to a computer-generated region.

BACKGROUND

An electronic device may enable manipulation of displayed content based on an input from an integrated input system, such as an extremity tracking input. Utilizing an input from an integrated input system in order to manipulate content introduces a number of issues. For example, when a physical object occludes a portion of an extremity of a user, the reliability of the extremity tracking input is correspondingly reduced. As another example, content that has a relatively high depth with respect to the display, such as a virtual object located in a scene background, may be difficult for a user to manipulate, thereby introducing tracking inaccuracies.

SUMMARY

In accordance with some implementations, a method is performed at an electronic device with a non-transitory memory, one or more processors, an eye tracker, a spatial selector tracker, and a display. The method includes displaying a content manipulation region. The method includes determining a first gaze position within the content manipulation region based on eye tracking data from the eye tracker. The method includes determining a selection point associated with a physical surface, based on spatial selector data from the spatial selector tracker. The method includes displaying a computer-generated representation of a trackpad at a placement location on the physical surface. The placement location is based on the first gaze position and the selection point.

In accordance with some implementations, a method is performed at an electronic device with a non-transitory memory, one or more processors, a spatial selector tracker, and a display. The method includes displaying a user interface including a plurality of content manipulation regions, a plurality of affordances respectively associated with the plurality of content manipulation regions, and a computer-generated representation of a trackpad. The method includes, while displaying the user interface, detecting, via the spatial selector tracker, an input directed to a first affordance of the plurality of affordances. The first affordance is associated with a first content manipulation region of the plurality of content manipulation regions. The method includes, in response to receiving the input, associating the computer-generated representation of the trackpad with the first content manipulation region.

In accordance with some implementations, an electronic device includes one or more processors, a non-transitory memory, a display, a spatial selector tracker, and optionally an eye tracker. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
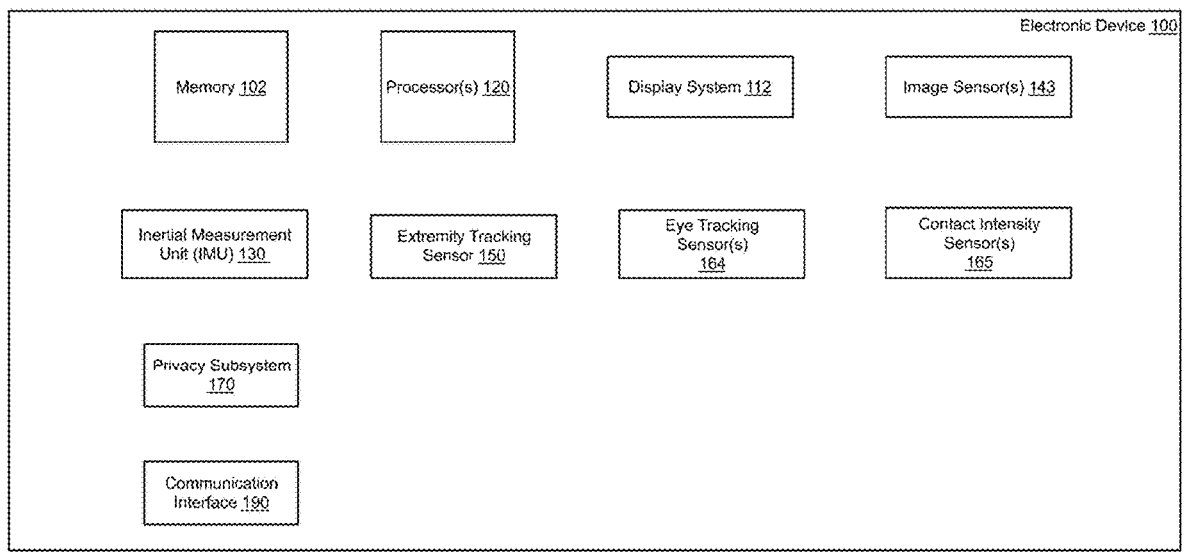
FIG. 1 is a block diagram of an example of an electronic device in accordance with some implementations.

An electronic device, including an integrated input system, may manipulate the display of a computer-generated object based on an input from the integrated input system. For example, the integrated input system includes an extremity tracking input system and/or an eye tracking input system. As one example, based on an extremity tracking input from the extremity tracking input system, the electronic device determines a corresponding extremity of a user satisfying a proximity threshold with respect to a particular computer-generated object. Accordingly, the electronic device manipulates the particular computer-generated object based on the extremity tracking input. However, utilizing an input from an integrated input system in order to manipulate a computer-generated object introduces a number of issues.

For example, when a physical object occludes (e.g., blocks) a portion of a user's extremity, the reliability of the extremity tracking input is correspondingly reduced. As another example, the limited mobility of a user's eyes and the unsteadiness of the user's extremity reduces the efficiency associated with manipulating a computer-generated object. As yet another example, a computer-generated object that has a relatively high depth with respect to the display, such as a computer-generated object located in a scene background, may be difficult for a user to manipulate, thereby introducing extremity tracking and eye tracking inaccuracies.

By contrast, various implementations disclosed herein include methods, electronic devices, and systems for manipulating content within a content manipulation region via an input within a computer-generated representation of a trackpad. The computer-generated representation of the trackpad is associated with a physical surface. Moreover, in some implementations, the computer-generated representation of the trackpad is substantially orthogonal to the content manipulation region. For example, the computer-generated representation of the trackpad is overlaid on a surface of a physical table, and the content manipulation region is substantially orthogonal to the surface of the physical table. As one example, the content manipulation region is orientated on the display in order to emulate a real-world television. In some implementations, an extremity of a user draws a path on a portion of the physical table surface that includes the computer-generated representation of the trackpad. Based on detecting the path within the computer-generated representation of the trackpad, an electronic device displays a corresponding overlay within the content manipulation region. The path on the physical table surface is typically steadier than a corresponding path directly within the content manipulation region, because the content manipulation region is not overlaid on a physical surface (e.g., the content manipulation region is floating). Accordingly, the corresponding overlay more accurately reflects an intent of the user, resulting in fewer corrective operations and thus less resource (e.g., processor) utilization.

According to various implementations, an electronic device displays a computer-generated representation of a trackpad at a placement location on the physical surface, based on eye tracking data and spatial selector data. To that end, the electronic device determines a first gaze position within a content manipulation region based on the eye tracking data. Moreover, the electronic device determines a selection point based on spatial selector data. The selection point is associated with (e.g., located on) the physical surface. In some implementations, the placement location is offset from the selection point based on the first gaze position. For example, while a user is gazing at the upper left corner of a content manipulation region, the user positions an extremity (e.g., a finger of the user) or positions a paired input device (e.g., a stylus) less than a threshold distance from a surface of a physical table. Based on performing computer vision, and/or based on sensor data from the paired input device case, the electronic device determines the selection point on the physical table surface. The spatial selector data may indicate a position of an extremity of a user or a position of a paired input device (e.g., a stylus). For example, the selection point is a point of contact with the physical table surface, or a point on the physical table surface that is directly beneath the extremity/paired input device when the extremity/paired input device is hovering over the physical table surface. Accordingly, in some implementations, the electronic device displays the computer-generated representation of the trackpad as offset from the selection point, based on the first gaze position. Namely, based on the placement location of the computer-generated representation of the trackpad, the selection point is positioned near the upper left corner of the computer-generated representation of the trackpad, mirroring the gaze of the user directed to the upper left corner of the content manipulation region. Accordingly, the starting point of an input within the computer-generated representation of the trackpad approximately corresponds to where the user is gazing within the content manipulation region, enabling the user to perform a more intuitive and accurate content manipulation operation.

In some implementations, the paired input device is wearable by a finger of a user. In some implementations, the electronic device tracks the finger with six degrees of freedom (6 DOF) based on sensor data from the paired input device. Accordingly, even when a physical object occludes a portion of the paired input device, the electronic device continues to receive sensor data from the paired input device. On the other hand, other devices cannot track an extremity of a user when a physical object occludes the extremity. In some implementations, the paired input device senses (e.g., via a pressure sensor) deflection of a pad of a finger when the finger contacts the physical surface. Accordingly, various implementations disclosed herein enable a user to feel a physical surface (and the texture of the physical surface) with which the user is interacting.

According to various implementations, while displaying the computer-generated representation of the trackpad, the electronic device displays a plurality of content manipulation regions. In some implementations, each of the plurality of content manipulation regions is associated with a corresponding application. For example, a first content manipulation region includes drawing content (part of a drawing application), a second content manipulation region includes webpage content (e.g., part of a web browser application), etc. Moreover, the electronic device displays a plurality of affordances respectively associated with the plurality of content manipulation regions. For example, based on detecting, via a spatial selector tracker, an input selecting a particular affordance, the electronic device associates the computer-generated representation of the trackpad with a particular content manipulation region. While the computer-generated representation of the trackpad with is associated with the particular content manipulation region, input(s) directed to within the computer-generated representation of the trackpad result in the electronic device performing a corresponding content manipulation operation within the particular content manipulation region. In some implementations, while the computer-generated representation of the trackpad with is associated with a first content manipulation region, a user may drag-and-drop content (e.g., an object) from the first content manipulation region to a second content manipulation region. For example, an input within the computer-generated representation of the trackpad selects an object within the first content manipulation region, and the input drags the object to within an affordance associated with the second content manipulation region, resulting in a paste object operation.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

FIG. 1 is a block diagram of an example of an electronic device 100 in accordance with some implementations. The electronic device 100 includes memory 102 (which optionally includes one or more computer readable storage mediums), one or more processing units (CPUs) 120, a display system 112, an inertial measurement unit (IMU) 130, image sensor(s) 143 (e.g., camera), contact intensity sensor(s) 165, eye tracking sensor(s) 164 (e.g., included within a head-mountable device (HMD)), an extremity tracking sensor 150, etc. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

The display system 112 provides an input interface and an output interface between the electronic device 100 and a user. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a paired input device.

In some implementations, the display system 112 corresponds to a display integrated in a head-mountable device (HMD), such as AR glasses. For example, the display system 112 includes a stereo display (e.g., stereo pair display) that provides (e.g., mimics) stereoscopic vision for eyes of a user wearing the HMD.

The display system 112 optionally uses LCD (liquid crystal display) technology, LPD (light emitting polymer display) technology, or LED (light emitting diode) technology, although other display technologies are used in other implementations. The display system 112 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a paired input device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in spatial selector data (e.g., extremity tracking data), eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
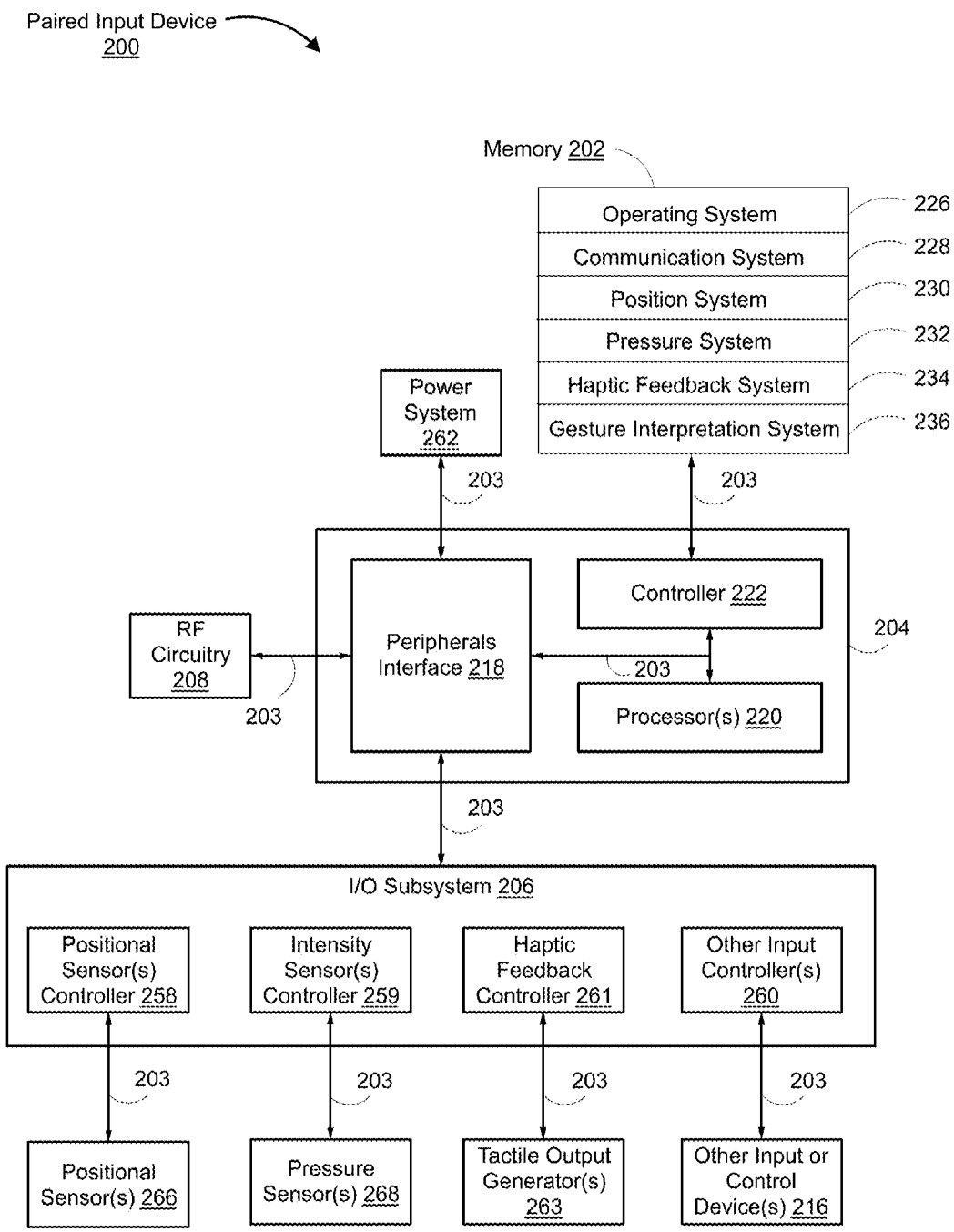
FIG. 2 is a block diagram of an example of a paired input device in accordance with some implementations.

The electronic device 100 includes a communication interface 190 that is provided to communicate with a paired input device, such as the paired input device 200 illustrated in FIG. 2 or the paired input device 330. For example, the communication interface 190 corresponds to one of a BLUETOOTH interface, IEEE 802.11x interface, near field communication (NFC) interface, and/or the like. According to various implementations, the electronic device 100 obtains sensor data from the paired input device via the communication interface 190, as will be further described below.

FIG. 2 is a block diagram of an example of a paired input device 200, such as a stylus or a finger-wearable device. The paired input device 200 includes memory 202 (which optionally includes one or more computer readable storage mediums), memory controller 222, one or more processing units (CPUs) 220, peripherals interface 218, RF circuitry 208, and input/output (I/O) subsystem 206. These components optionally communicate over one or more communication buses or signal lines 203. One of ordinary skill in the art will appreciate that the paired input device 200 illustrated in FIG. 2 is one example of a paired input device, and that the paired input device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The paired input device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the paired input device 200, such as CPU(s) 220 and the peripherals interface 218, is, optionally, controlled by memory controller 222.

The peripherals interface 218 can be used to couple input and output peripherals of the paired input device 200 to the CPU(s) 220 and the memory 202. The one or more processors 220 run or execute various software programs and/or sets of instructions stored in memory 202 to perform various functions for the paired input device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the paired input device 200, such as other input or control devices 216, with the peripherals interface 218. The I/O subsystem 206 optionally includes one or more positional sensor controllers 258, one or more pressure sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the paired input device 200 includes one or more positional sensors 266 that output positional data associated with the paired input device 200. The positional data is indicative of a position, orientation, or movement of the paired input device 200, such as a rotational movement or translational movement of the paired input device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data, such as the position of the paired input device 200. For example, the magnetic sensor measures weak magnetic fields in order to determine a position of the paired input device 200.

In some implementations, the paired input device 200 includes one or more pressure sensors 268 for detecting intensity (e.g., force or pressure) of a contact of a finger, wearing the paired input device 200, on a physical object. The one or more pressure sensors 268 output pressure sensor data associated with the paired input device 200. As one example, the pressure sensor data is indicative of the force or pressure of a tap gesture associated with a finger, which is wearing the paired input device 200, tapping on a surface of a physical table. The one or more pressure sensors 268 may include an interferometer. The one or more pressure sensors 268 may include one or more piezoresistive strain gauges, capacitive force sensors, electric force sensors, piezoelectric force sensors, optical force sensors, capacitive touch-sensitive surfaces, or other intensity sensors.

The paired input device 200 optionally includes one or more tactile output generators 263 for generating tactile outputs on the paired input device 200. In some implementations, the term "tactile output" refers to physical displacement of an accessory (e.g., the paired input device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the paired input device 200) is, optionally, interpreted by the user as a "click" of a physical actuator button. In some cases, a user will feel a tactile sensation such as a "click" even when there is no movement of a physical actuator button associated with the paired input device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the paired input device 200 that are capable of being sensed by a user of the paired input device 200.

In some implementations, the software components stored in the memory 202 include an operating system 226, a communication system (or set of instructions) 228, a position system (or set of instructions) 230, a pressure system (or set of instructions) 232, a haptic feedback system (or set of instructions) 234, and a gesture interpretation system (or set of instructions) 236. Furthermore, in some implementations, the memory 202 stores device/global internal state associated with the paired input device. The device/global internal state includes one or more of: sensor state, including information obtained from the paired input device's various sensors and other input or control devices 216; positional state, including information regarding the paired input device's position (e.g., position, orientation, tilt, roll and/or distance) relative to an electronic device (e.g., the electronic device 100); and location information concerning the paired input device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the paired input device 200. The position system 230 optionally includes software components for performing various operations related to detecting the position of the paired input device 200 and detecting changes to the position of the paired input device 200 in a particular frame of reference. In some implementations, the position system 230 detects the positional state of the paired input device 200 relative to the electronic device and detects changes to the positional state of the paired input device 200 relative to the electronic device. As noted above, in some implementations, the electronic device 100 or 310 determines the positional state of the paired input device 200 relative to the electronic device and changes to the positional state of the paired input device 200 using information from the position system 230.

The pressure system 232, in conjunction with pressure sensor data from the one or more pressure sensor(s) 268, optionally detects contact intensity information associated with the paired input device 200. The pressure system 232 includes software components for performing various operations related to detection of contact, such as detecting the intensity and/or duration of a contact between the paired input device 200 and a desk surface. Determining movement of the point of contact, which is represented by a series of pressure data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on paired input device 200 in response to user interactions with the paired input device 200.

The paired input device 200 optionally includes a gesture interpretation system 236. The gesture interpretation system 236 coordinates with the position system 230 and/or the pressure system 232 in order to determine a gesture performed by the paired input device. For example, the gesture includes one or more of: a pinch gesture, a pull gesture, a pinch and pull gesture, a rotational gesture, a tap gesture, and/or the like. In some implementations, the paired input device 200 does not include a gesture interpretation system, and an electronic device or a system (e.g., the gesture interpretation system 445 in FIG. 4) determines a gesture performed by the paired input device 200 based on sensor data from the paired input device 200. In some implementations, a portion of the gesture determination is performed at the paired input device 200, and a portion of the gesture determination is performed at an electronic device/system. In some implementations, the gesture interpretation system 236 determines a time duration associated with a gesture. In some implementations, the gesture interpretation system 236 determines a pressure associated with a gesture, such as an amount of pressure associated with a finger (wearing the paired input device 200) tapping on a physical surface.

Each of the above identified modules and applications correspond to a set of executable instructions for performing one or more functions described above and the methods described in this application (e.g., the computer-implemented methods and other information processing methods described herein). These systems (e.g., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

Figure 3A:
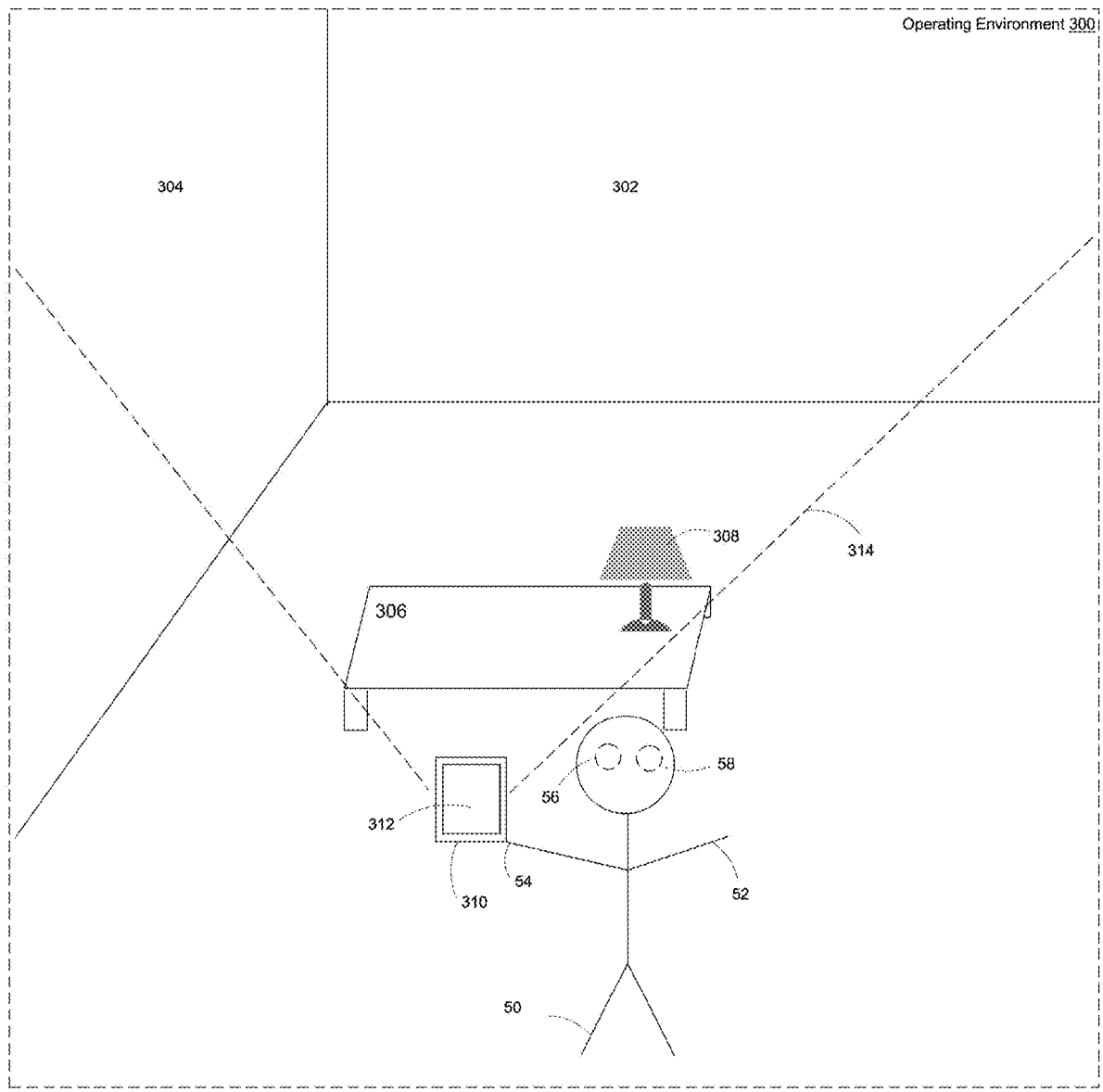
FIGS. 3A-3U are examples of positioning a computer-generated representation of a trackpad based on eye tracking data and spatial selector data in accordance with some implementations.
Figure 3B:
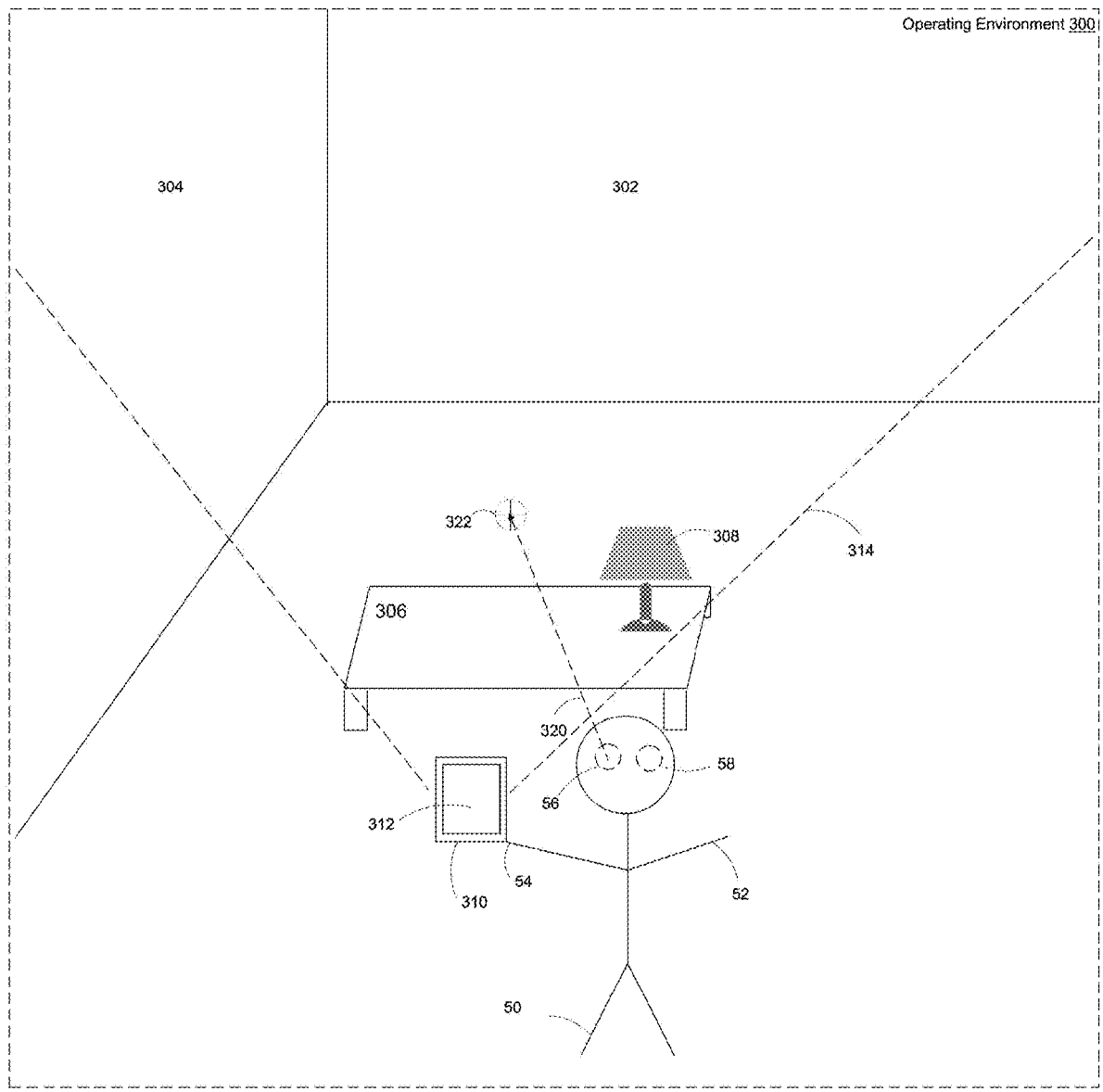
Figure 3C:
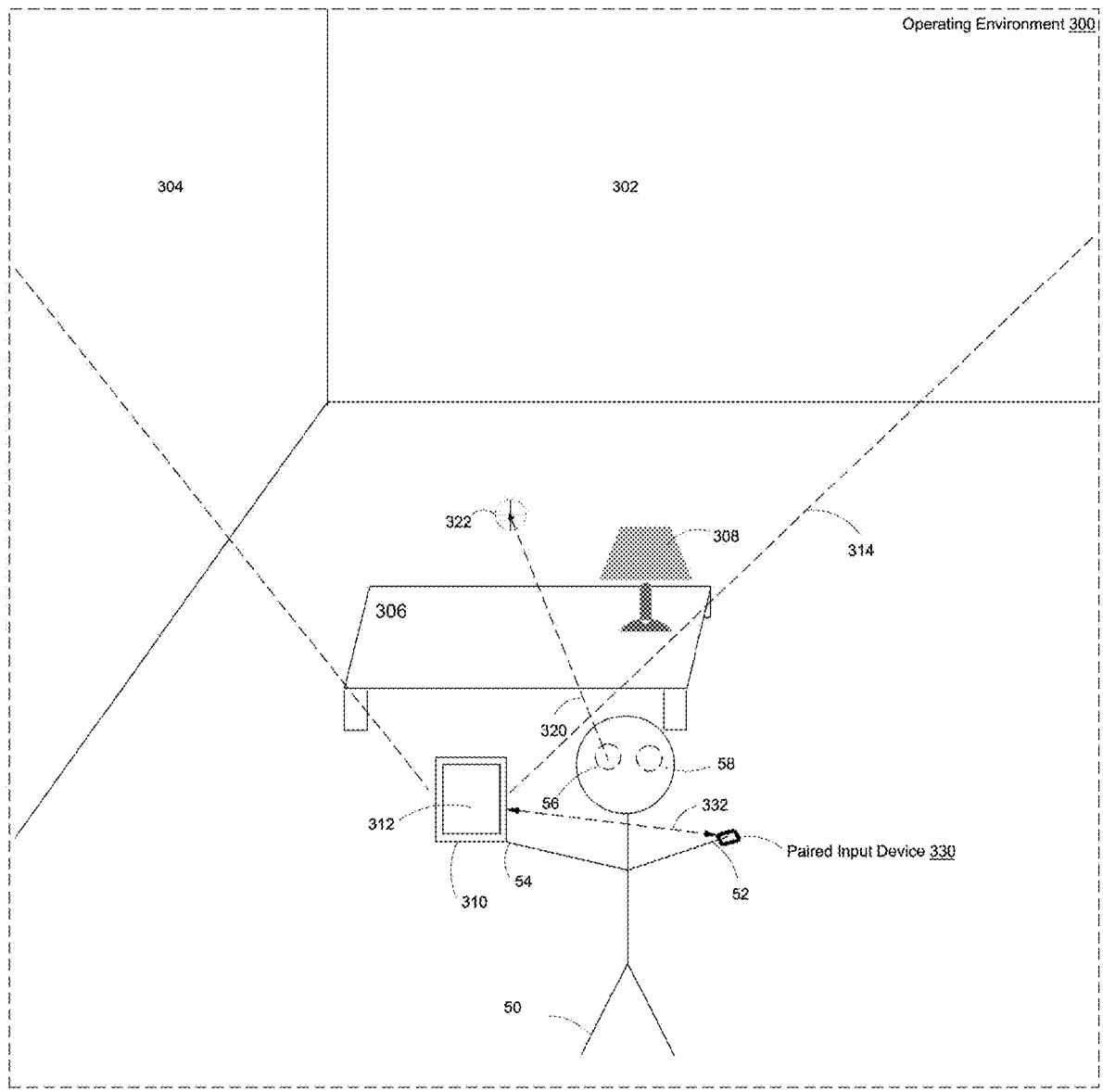
Figure 3D:
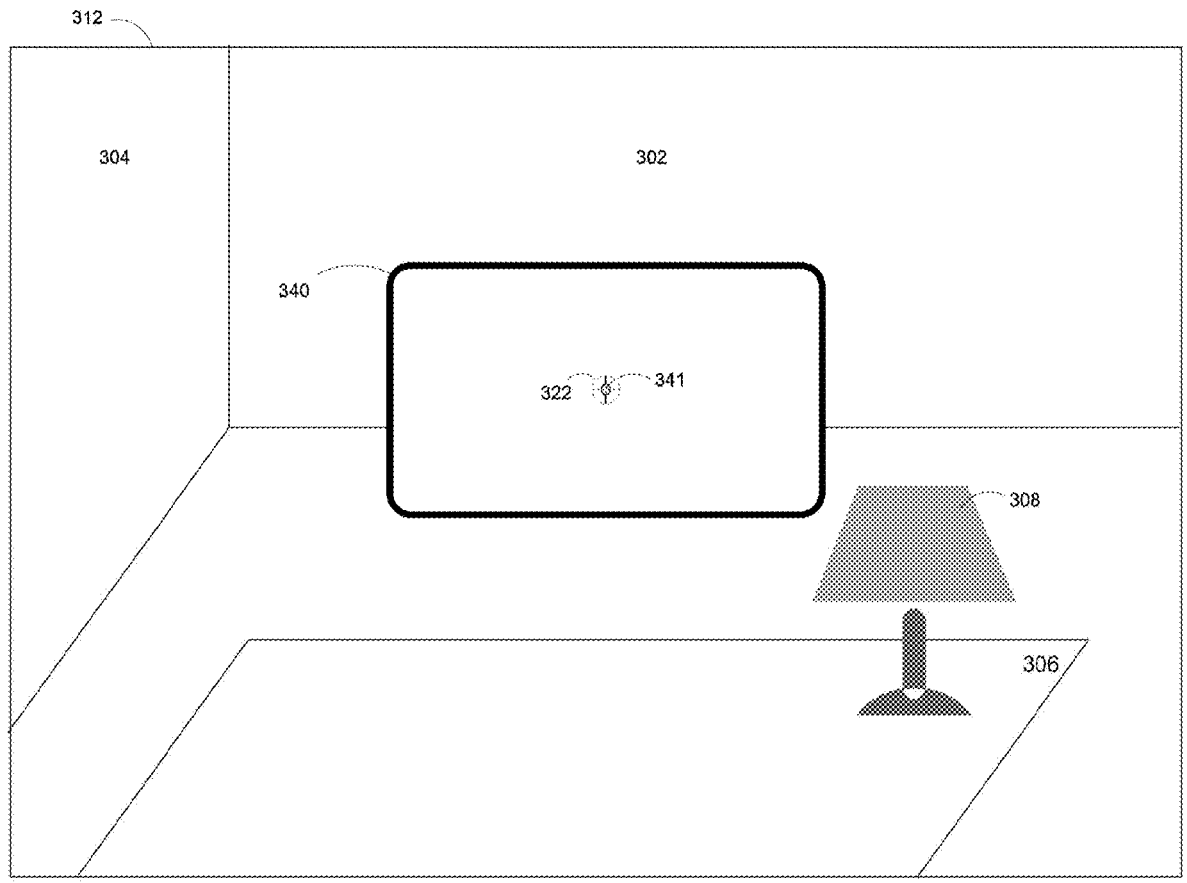
Figure 3E:
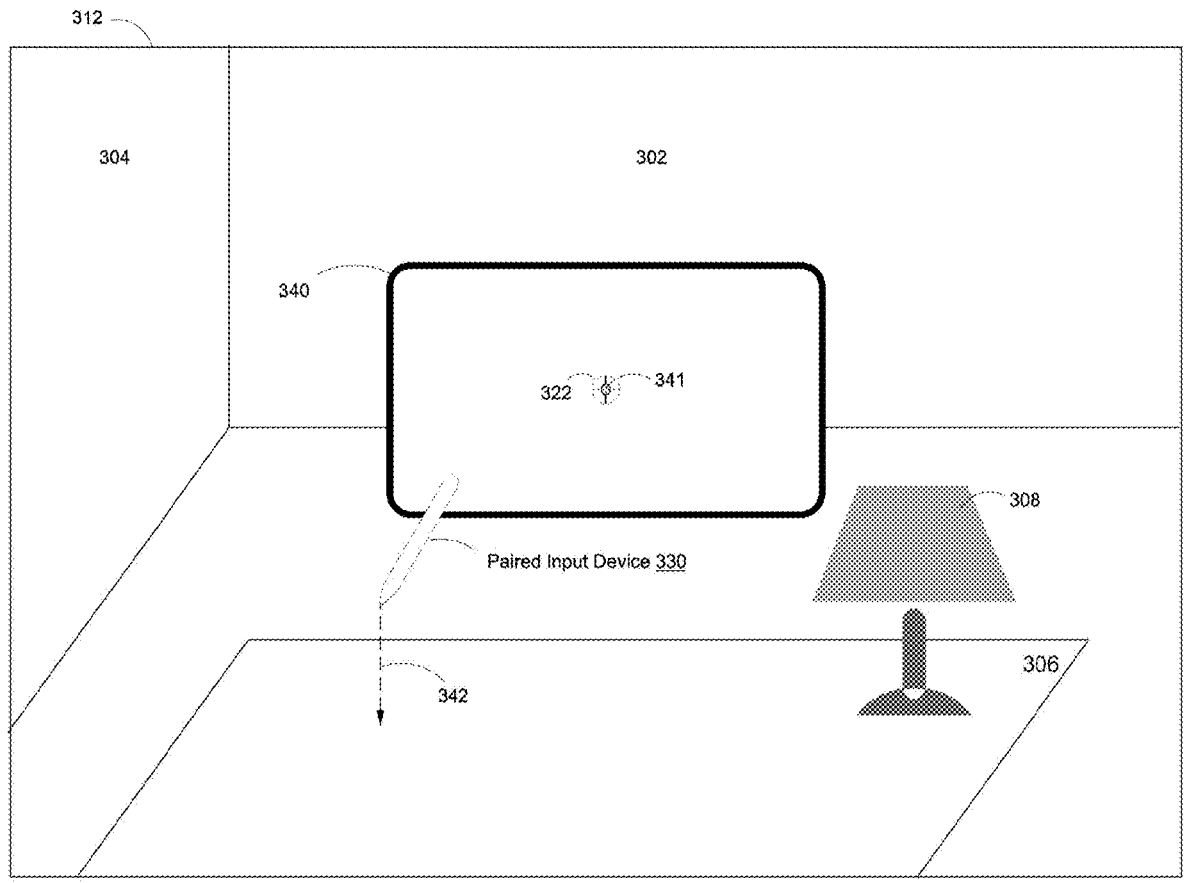
Figure 3F:
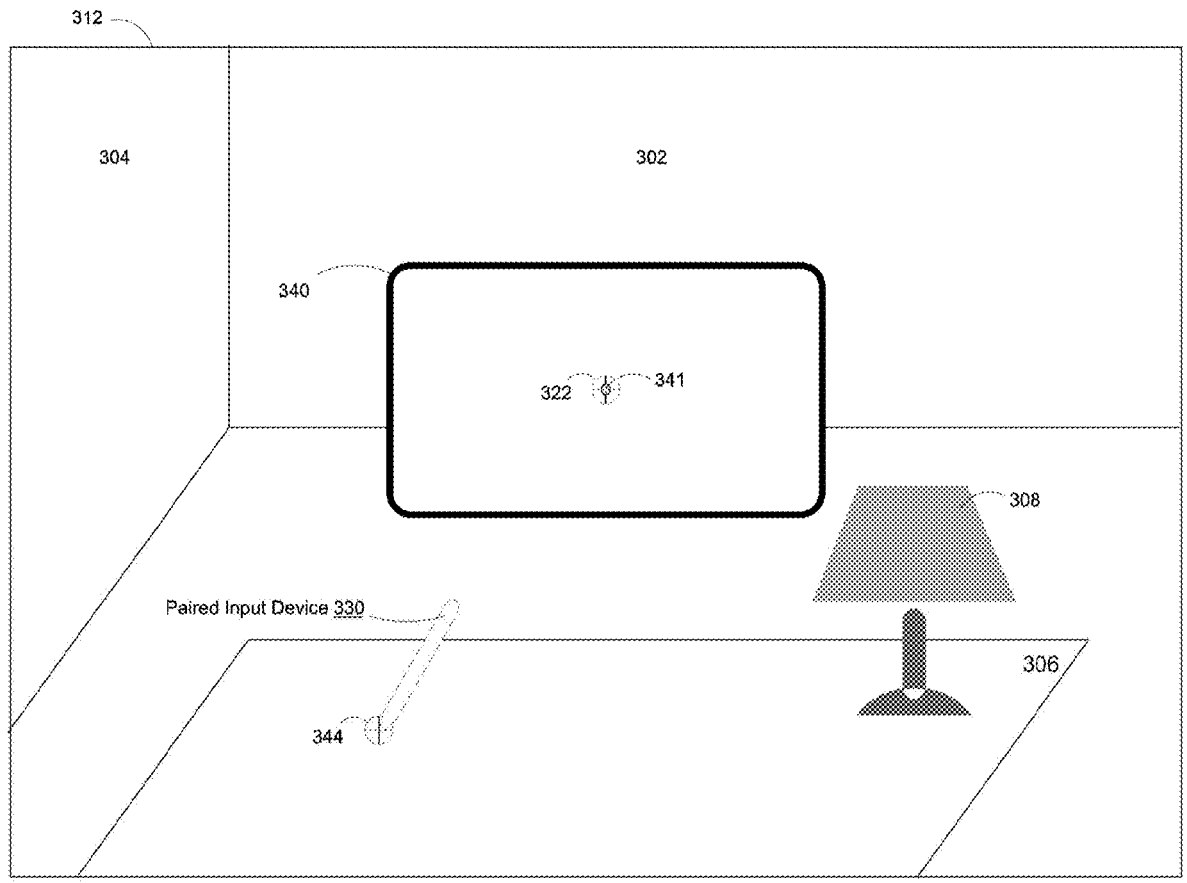
Figure 3G:
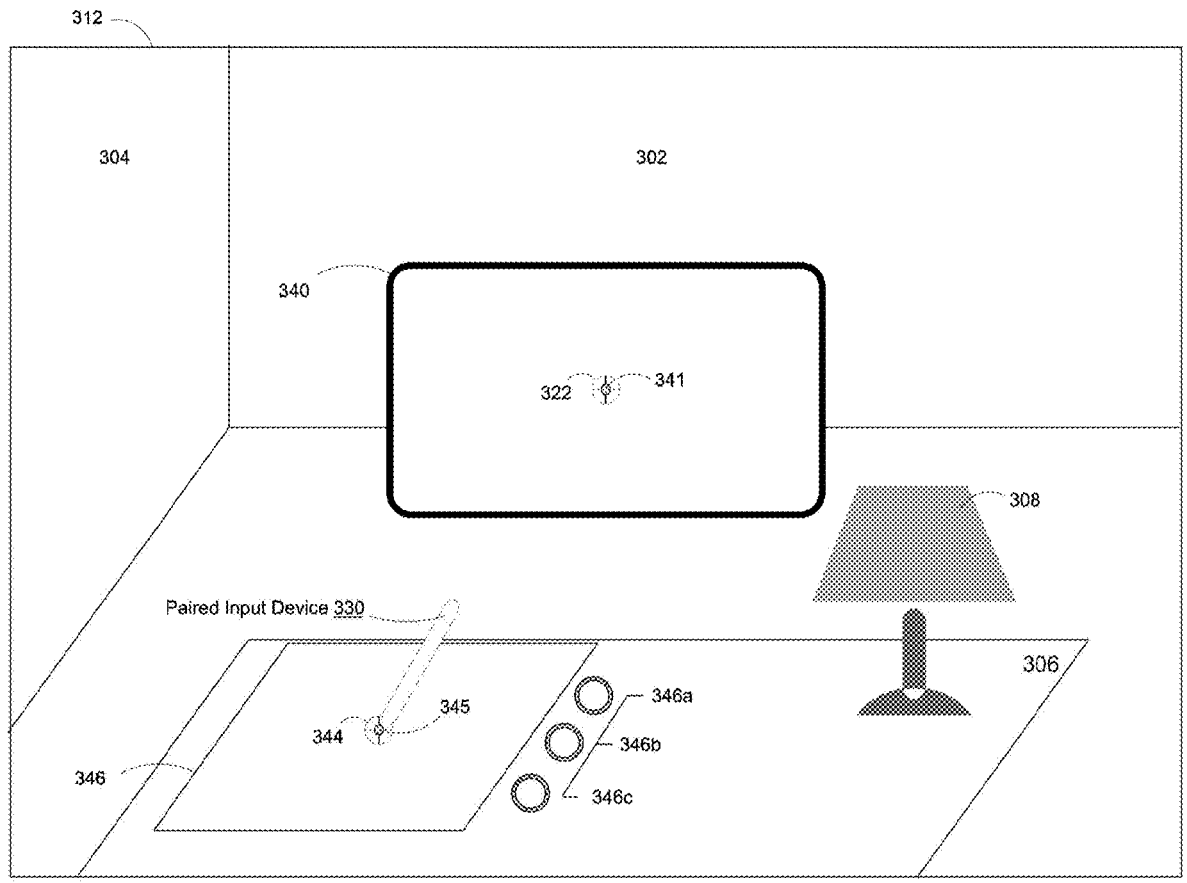
Figure 3H:
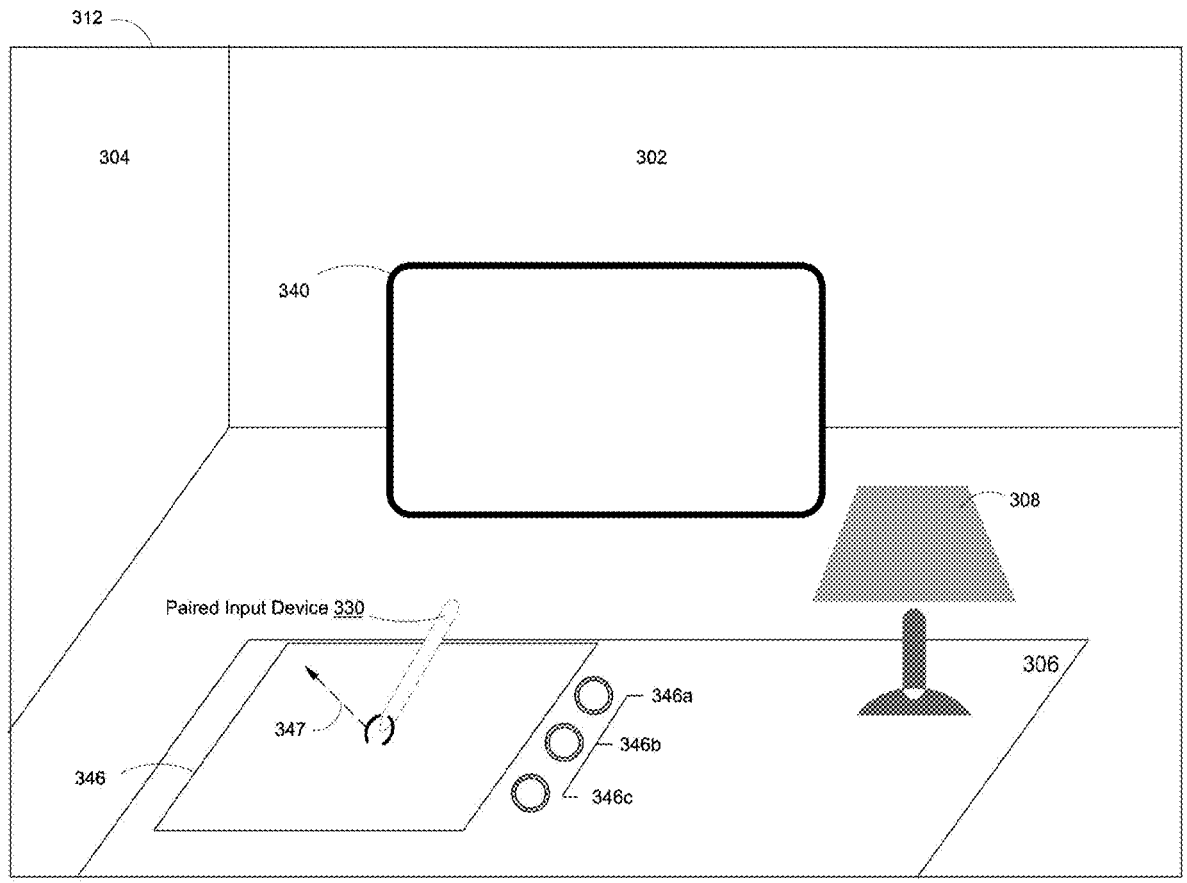
Figure 3I:
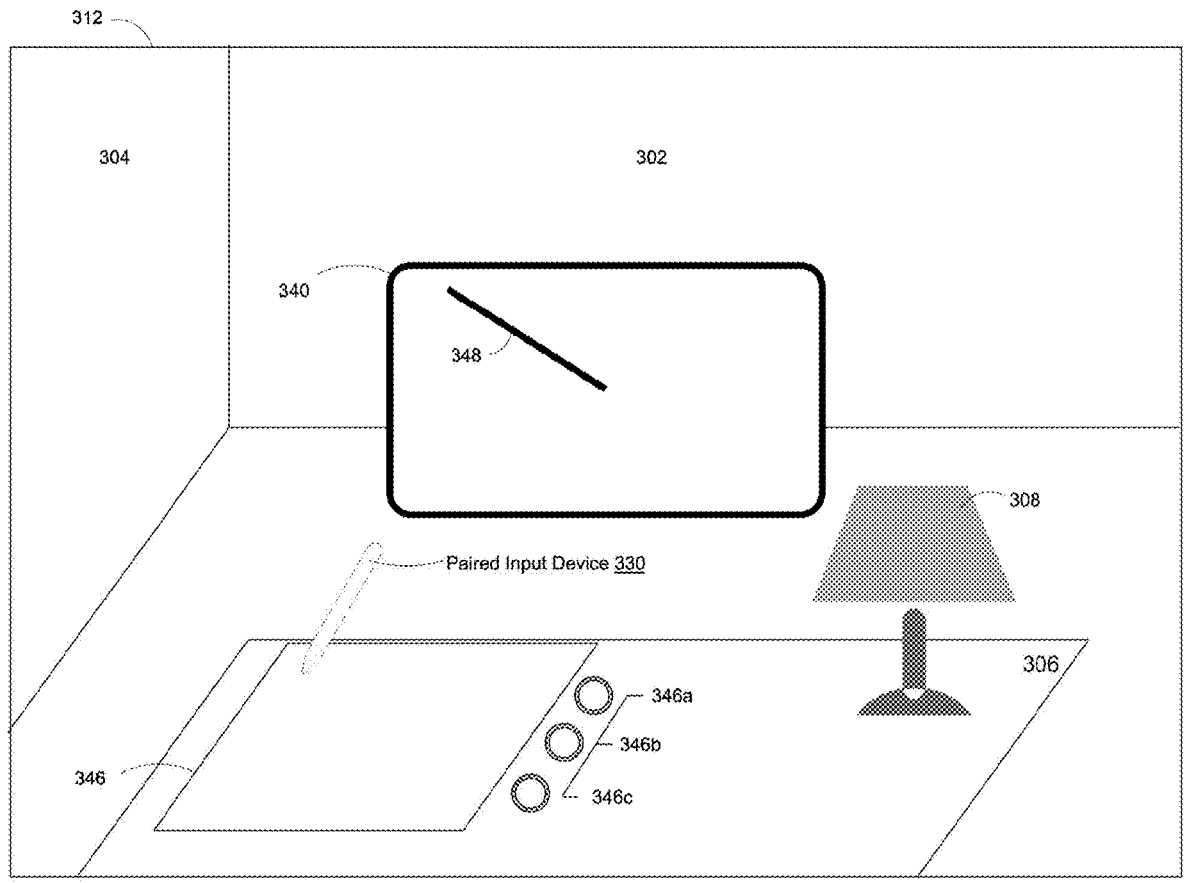
Figure 3J:
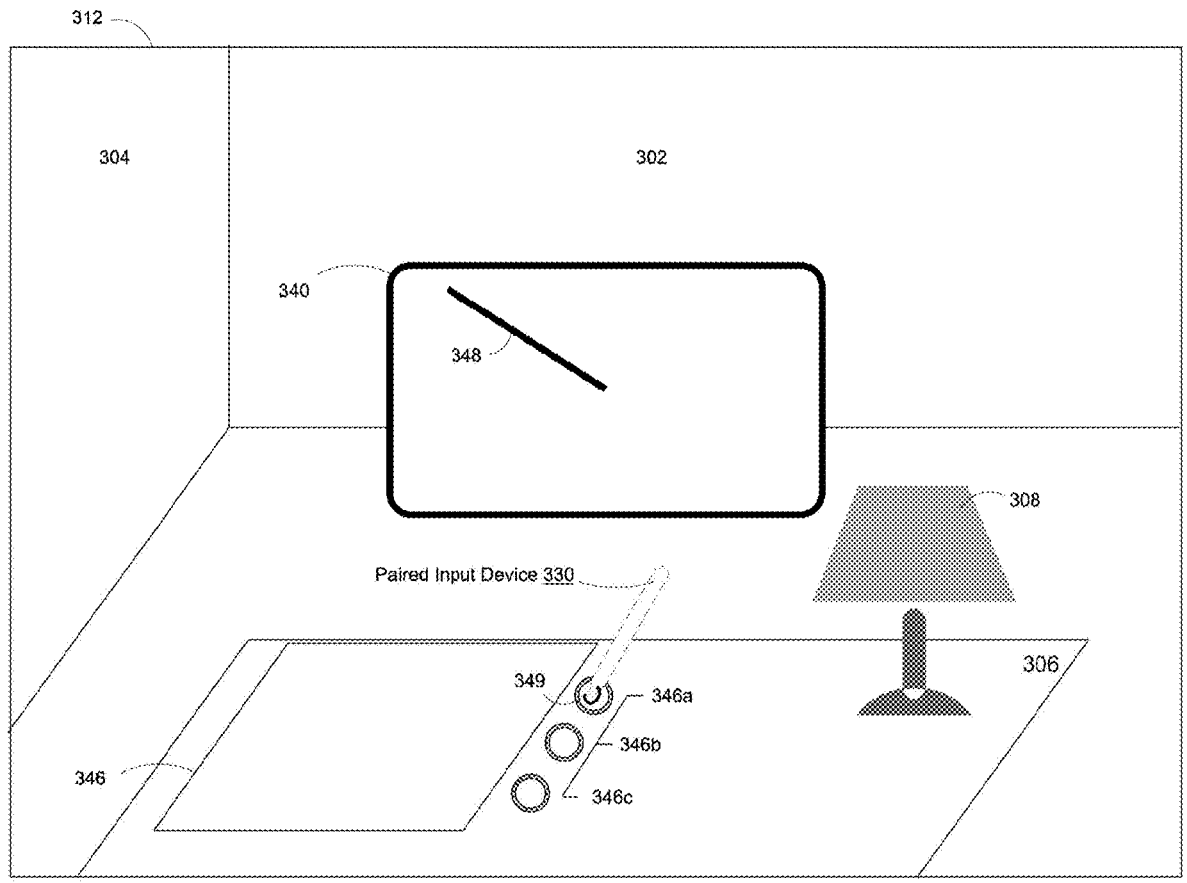
Figure 3K:
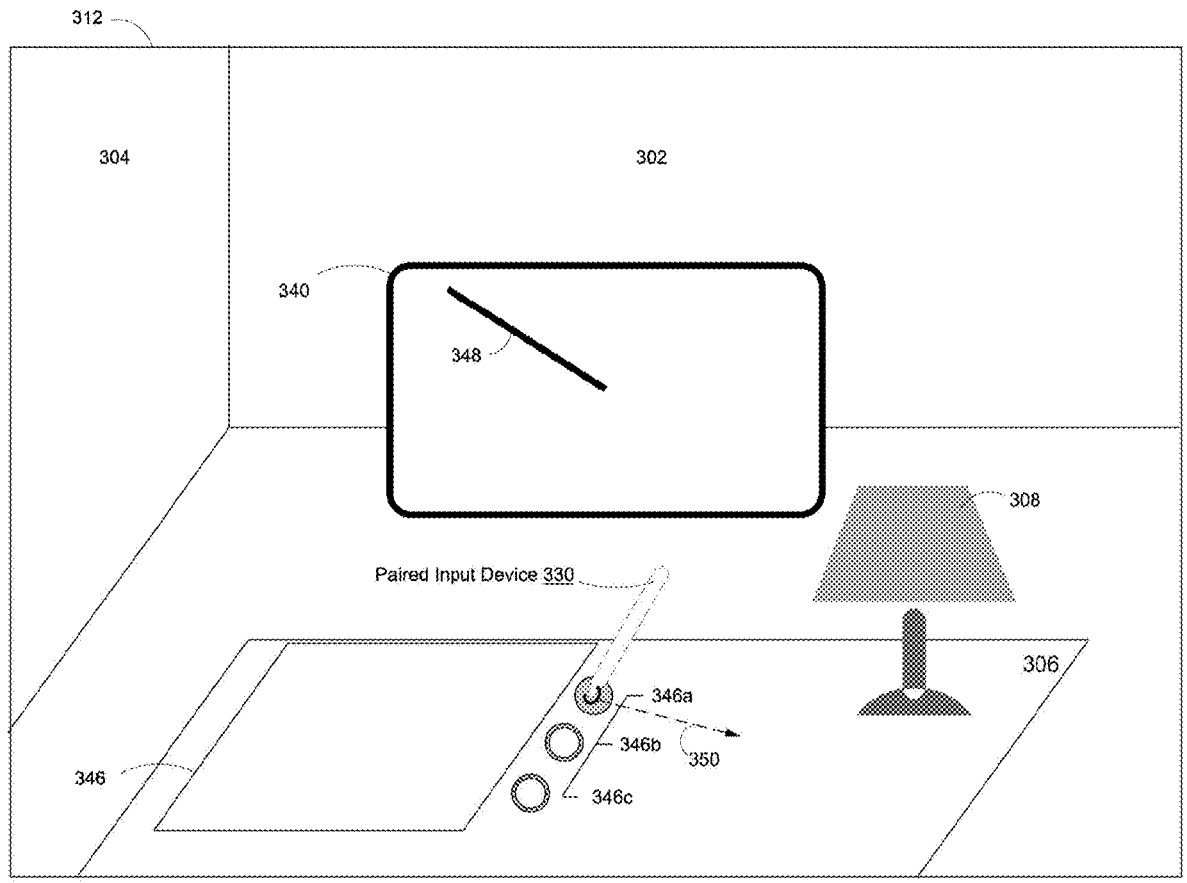
Figure 3L:
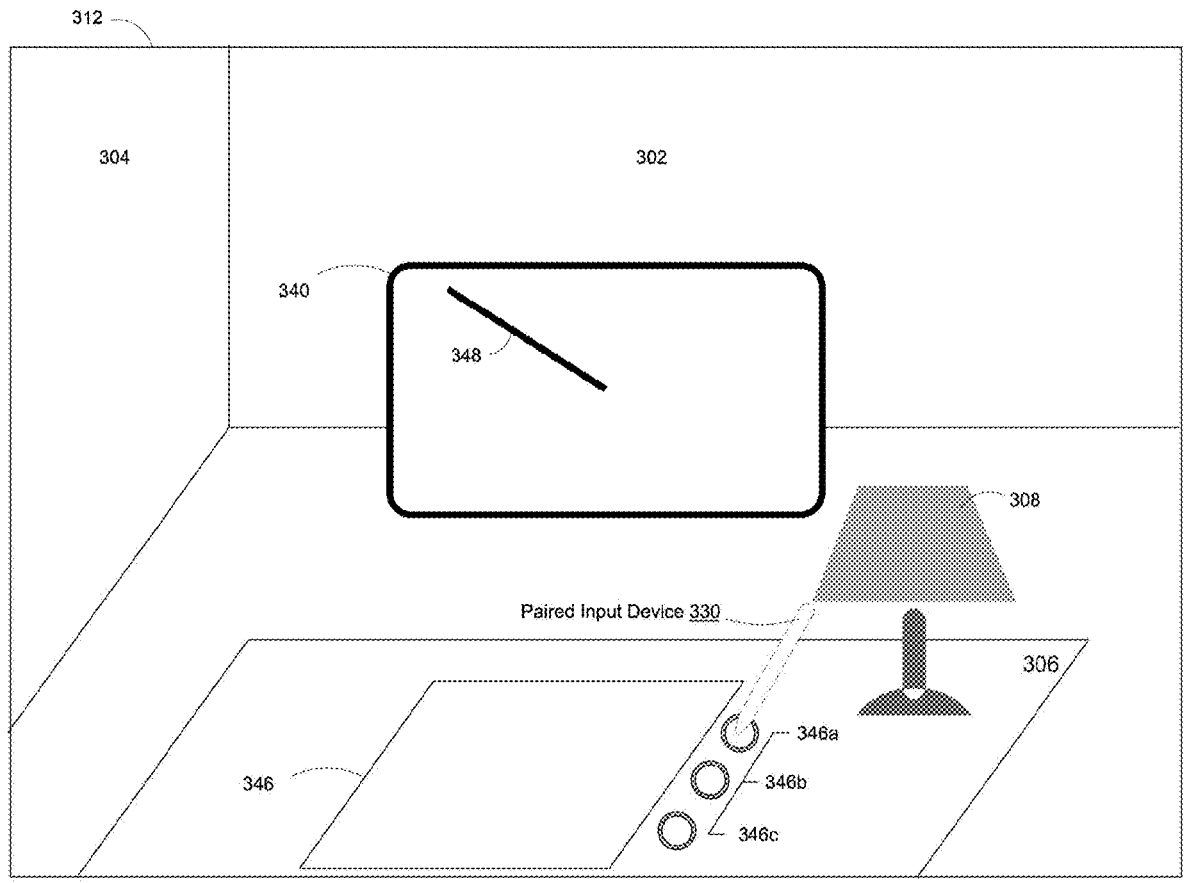
Figure 3M:
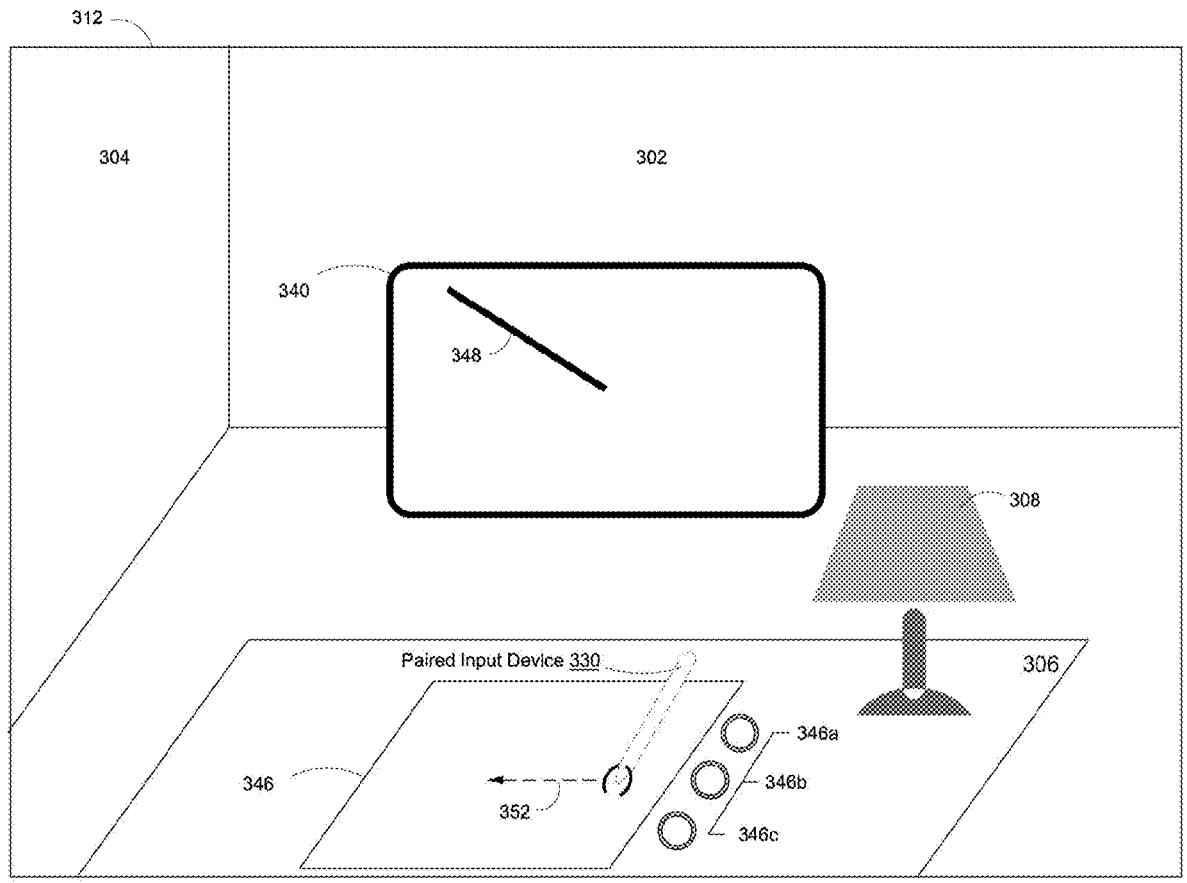
Figure 3N:
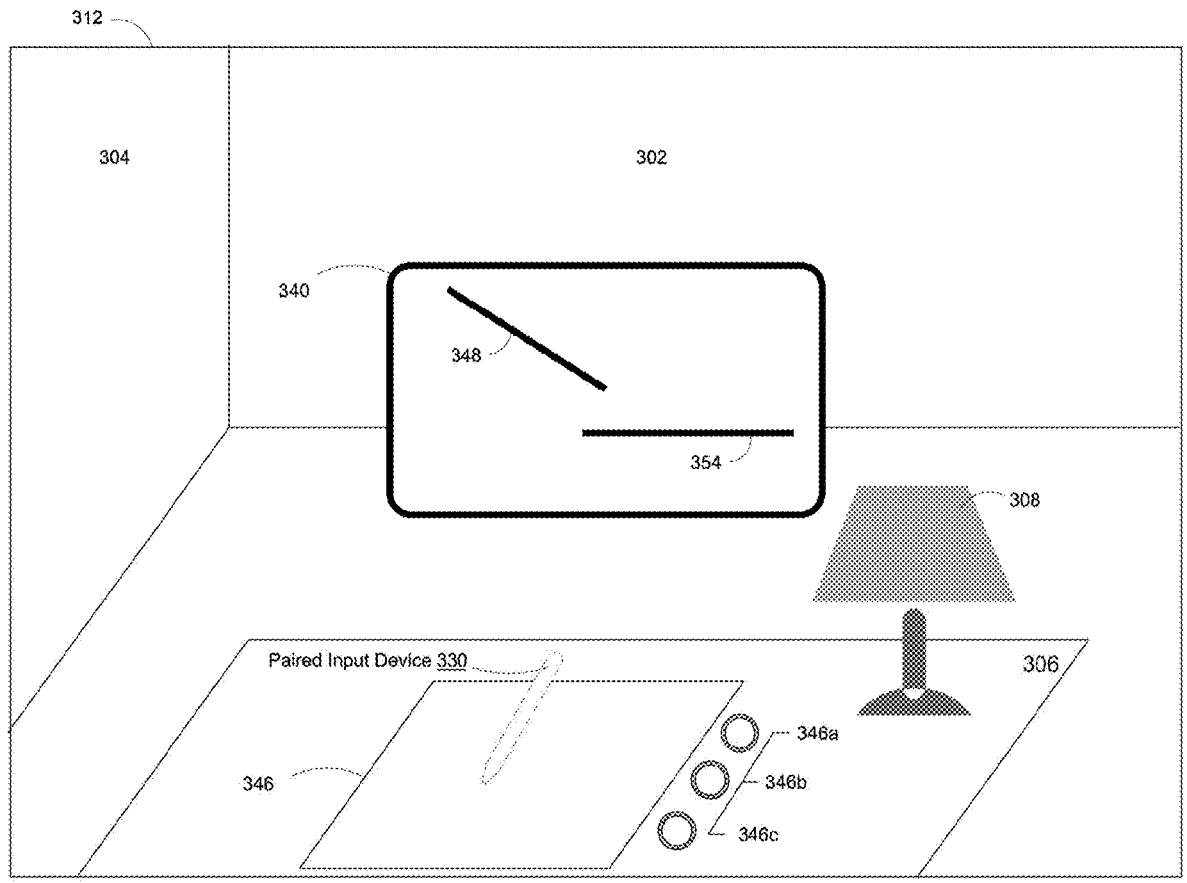
Figure 3O:
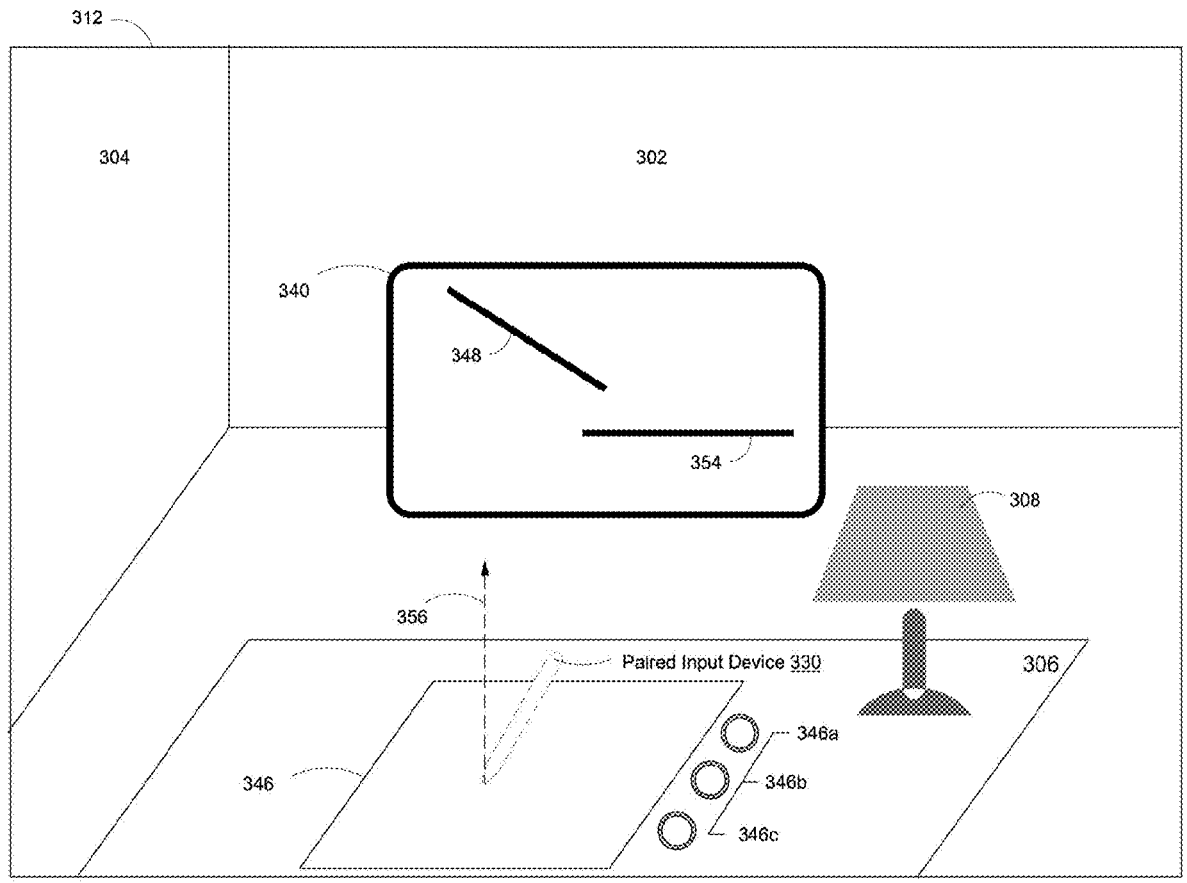
Figure 3P:
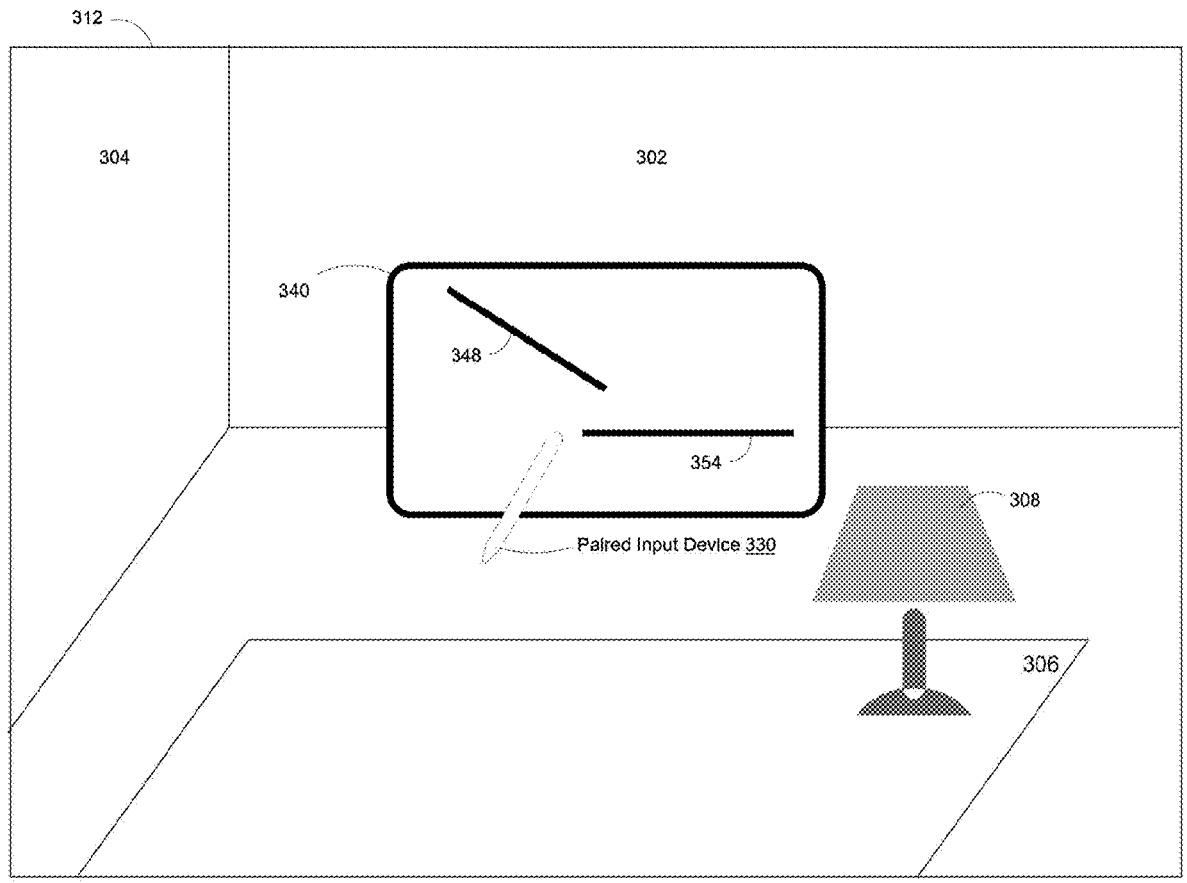
Figure 3Q:
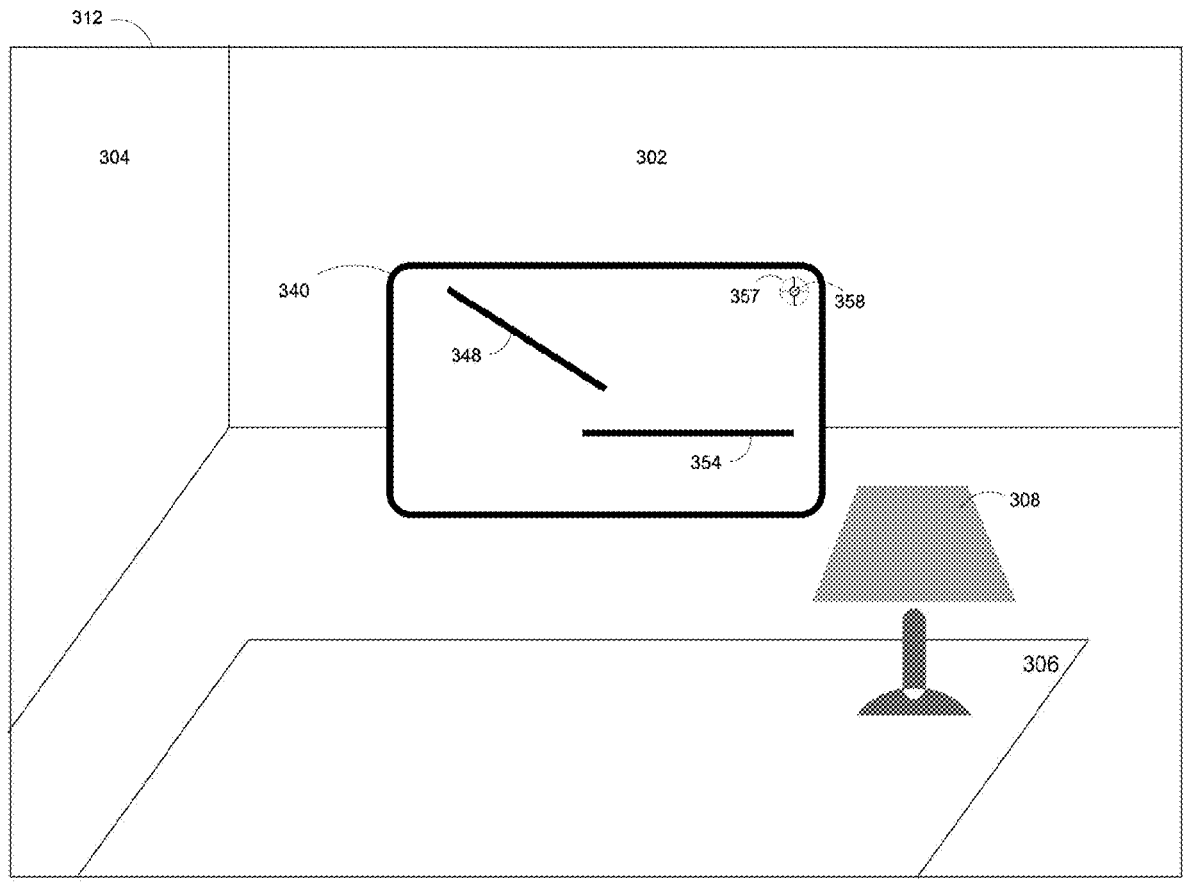
Figure 3R:
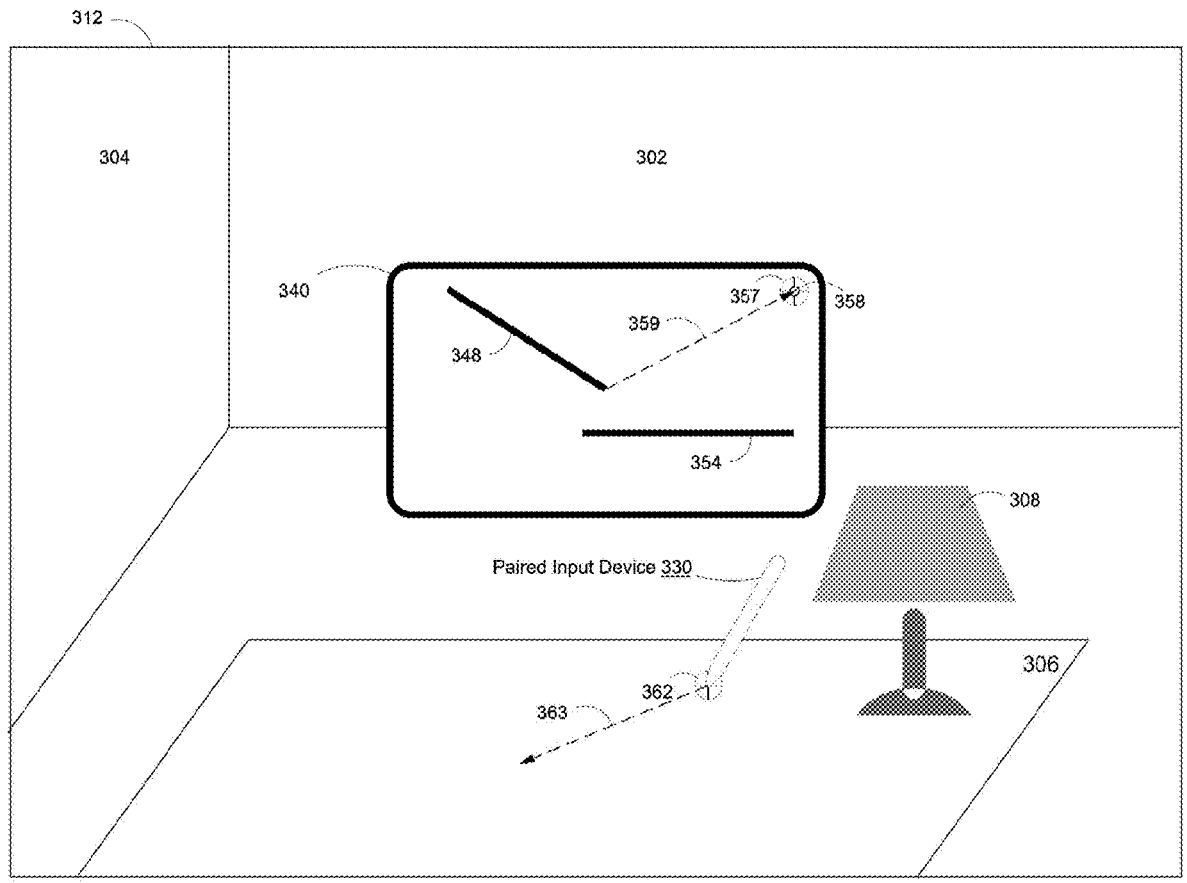
Figure 3S:
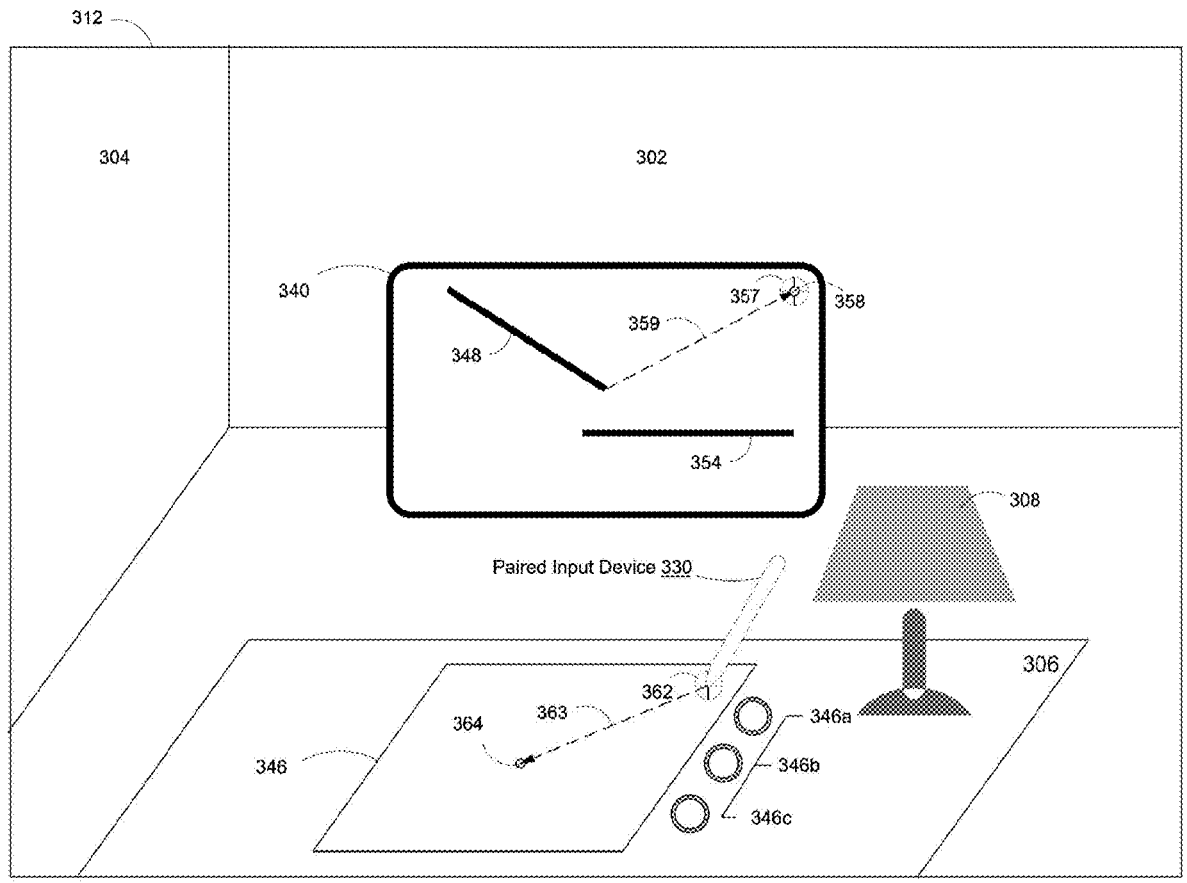
Figure 3T:
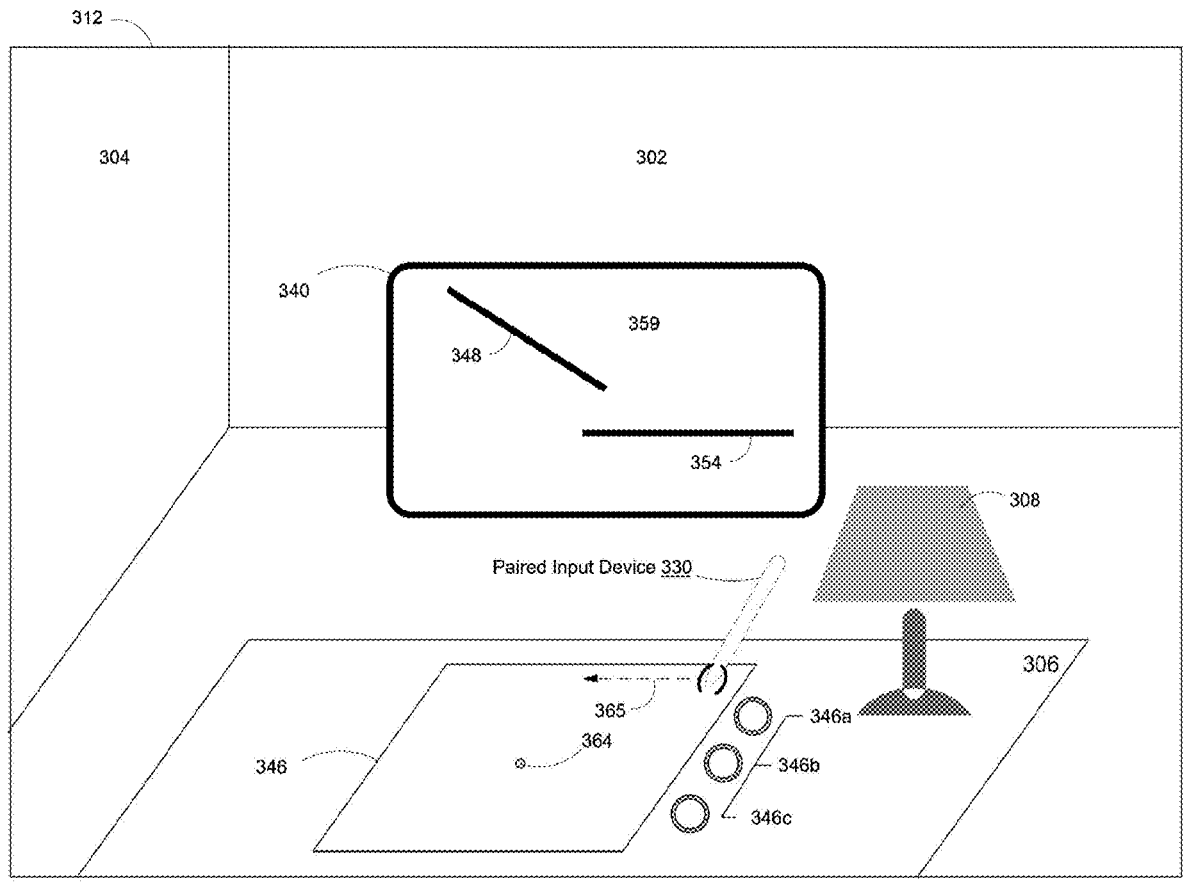
Figure 3U:
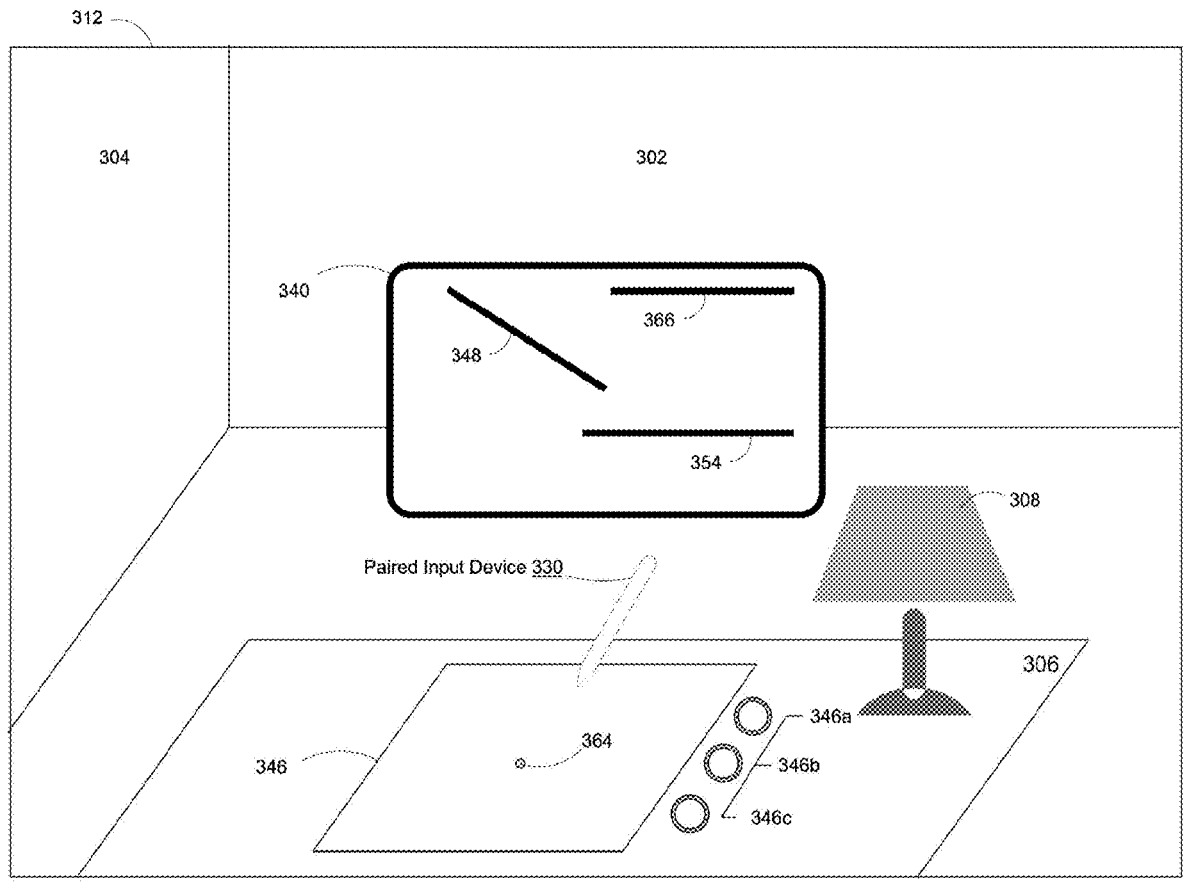

FIGS. 3A-3U are examples of positioning a computer-generated representation of a trackpad based on eye tracking data and spatial selector data in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 3A, a user 50 is facing a portion of an operating environment 300 that includes a first physical wall 302, a second physical wall 304, a physical table 306, and a physical lamp 308 lying on the physical table 306. A left hand 54 of the user 50 holds an electronic device 310, such as a tablet or smartphone. The electronic device 310 is associated with (e.g., operates according to) an operating environment 300. To that end, in some implementations, the electronic device 310 generates an extended reality (XR) setting, such as generating an augmented reality (AR) environment, a mixed reality (MR) environment, and/or the like. In some implementations, the electronic device 310 is similar to and adapted from the electronic device 100 in FIG. 1.

The electronic device 310 includes a display 312 that is associated with a viewable region 314 of the operating environment 300. For example, in some implementations, the electronic device 310 includes an image sensor associated with a field-of-view corresponding to the viewable region 314, and the electronic device 310 composites pass through image data from the image sensor with computer-generated content. As another example, in some implementations, the electronic device 310 includes a see-through display 312 that enables ambient light to enter from a portion of a physical environment that is associated with the viewable region 314.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

As illustrated in FIG. 3B, a left eye 56 of the user 50 focuses on a first portion 322 of the operating environment 300 that is above the physical table 306, as indicated by a gaze line 320 between the left eye 56 and the first portion 322. The electronic device 310 includes an eye tracker that generates eye tracking data indicative of the gaze or focus of the left eye 56 of the user 50. One of ordinary skill in the art will appreciate that, in some implementations, the eye tracking data additionally or alternatively is indicative of a right eye 58 of the user 50. As will be described below, the electronic device 310 uses the eye tracking data in order to determine one or more gaze positions within a content manipulation region 340.

In some implementations, the electronic device 310 is paired with a paired input device, and utilizes sensor data from the paired input device in order to position a computer-generated representation of a trackpad. For example, as illustrated in FIG. 3C, the electronic device 310 is paired with a paired input device 330, which is physically manipulatable by a right hand 52 of the user 50. To that end, in some implementations, the electronic device 310 includes a communication interface (e.g., the communication interface 190 in FIG. 1) that is provided to communicate with the paired input device 330. The electronic device 310 establishes a communication link with the paired input device 330, as is indicated by a communication link line 332. Establishing the link between the electronic device 310 and the paired input device 330 is sometimes referred to as pairing or tethering. One of ordinary skill in the art will appreciate that the electronic device 310 may communicate with the paired input device 330 according to a variety of communication protocols, such as BLUETOOTH, IEEE 802.11x, NFC, etc. The electronic device 310 obtains sensor data from the paired input device 330 via the communication interface. For example, the electronic device 310 obtains a combination of positional data (e.g., output by positional sensor(s) of the paired input device 330) and pressure sensor data (e.g., output by pressure sensor(s) of the paired input device 330).

Although the examples described with reference to FIGS. 3E-3U and 4A-4J illustrate the paired input device 330, various implementations include facilitating user interactions with a computer-generated representation of a trackpad, independent of sensor data. For example, in some implementations, the electronic device 310 performs computer vision in order to track an extremity of the user 50, such as a finger of the right hand 52. As one example, the electronic device 310 includes an image sensor (e.g., a camera) that generates image data, and the electronic device 310 performs sematic segmentation in order to identify the extremity within the image data.

As illustrated in FIG. 3D, the electronic device 310 displays, on the display 312, a content manipulation region 340. In some implementations, the content manipulation region 340 is associated with a particular application, such as a web browser application, a word processing application, a drawing application, etc. Notably, the first portion 322 of the operating environment 300 (focused on by the left eye 56) is located at approximately the center of the content manipulation region 340. Based on the eye tracking data, the electronic device 310 determines a first gaze position 341 at approximately the center of the content manipulation region 340.

The display 312 further includes various representations of physical elements that are within the viewable region 314. For example, the display 312 includes respective representations of a portion of the first physical wall 302, a portion of the second physical wall 304, a portion of the physical table 306, and the physical lamp 308.

As illustrated in FIG. 3E, the paired input device 330 moves downwards towards a point on the surface of the physical table 306, as indicated by a movement line 342. While the paired input device 330 is viewable on the display 312, the electronic device 310 obtains spatial selector data from a spatial selector tracker. For example, in some implementations, the spatial selector tracker performs computer vision in order to track the paired input device 330 within image data. As another example, in some implementations, the spatial selector tracker obtains sensor data from a sensor on the paired input device 330, such as pressure sensor data or proximity sensor data. As yet example, in some implementations, the spatial selector tracker performs computer vision in order to track an extremity (e.g., a finger) of a user.

Based on the spatial selector data, the electronic device 310 determines a first selection point 344 on the surface of the physical table 306, as illustrated in FIG. 3F. For example, the first selection point 344 corresponds to the contact point between the paired input device 330 and the surface of the physical table 306, which may be indicated by pressure sensor data. As another example, the first selection point 344 corresponds to a point of the physical table 306 directly beneath the paired input device 330, when the paired input device 330 hovers less than a threshold distance above the surface of the physical table 306. The electronic device 310 may utilize computer vision or proximity sensor data in order to determine when the paired input device 330 hovers less than the threshold distance from the surface of the physical table 306.

As illustrated in FIG. 3G, the electronic device 310 displays, on the display 312, a computer-generated representation of a trackpad 346 (hereinafter sometimes "trackpad 346" or "trackpad" for the sake of brevity) at a first placement location 345 on the surface of the physical table 306. For example, the first placement location 345 corresponds to approximately the center of the trackpad 346. The electronic device 310 determines the first placement location 345 based on the first gaze position 341 and the first selection point 344. Namely, because the first gaze position 341 is at approximately the center of the content manipulation region 340, the first placement location 345 is likewise at approximately the center of the trackpad 346. In other words, in this case, the electronic device 310 does not offset the center of the trackpad 346 from the first selection point 344 because the user 50 focuses on the center of the content manipulation region 340. Based on detecting a subsequent movement of the paired input device 330 within the trackpad 346, the electronic device 310 may display a corresponding mark within the content manipulation region 340, wherein the corresponding mark originates at the first gaze position 341.

In some implementations, the electronic device 310 displays, on the display 312, various trackpad manipulation affordances for manipulating the trackpad 346. For example, as illustrated in FIG. 3G, the trackpad manipulation affordances include a first trackpad manipulation affordance 346*a* for moving the trackpad 346, a second trackpad manipulation affordance 346*b* for resizing the trackpad 346, and a third trackpad manipulation affordance 346*c* for otherwise changing an appearance of the trackpad 346.

As illustrated in FIG. 3H, the electronic device 310 detects a first movement 347 of the paired electronic device 330 within the trackpad 346. The first movement 347 corresponds to a diagonal movement, across a portion of the surface of the physical table 306, towards the upper left corner of the trackpad 346. For example, the electronic device 310 detects various movements of the paired electronic device 330 based on computer vision and/or sensor data from the paired electronic device 330.

Based on detecting the first movement 347, the electronic device 310 performs a first content manipulation operation with respect to the content manipulation region 340. For example, as illustrated in FIG. 3I, the electronic device 310 displays, on the display 312, a first drawing mark 348 based on the first movement 347. To that end, in some implementations, the electronic device 310 determines a mapping between the trackpad 346 and the content manipulation region 340.

The trackpad 346 may be associated with a first dimensional characteristic (e.g., a first display area) that is different from a second dimensional characteristic (e.g., a second display area) associated with the content manipulation region 340. In some implementations, despite differences in respective dimensional characteristics, the electronic device 310 maps between the trackpad 346 and the content manipulation region 340 according to a common aspect ratio. For example, the trackpad 346 corresponds to a 30 cm×30 cm square, and the content manipulation region 340 corresponds to a 160 cm×90 cm rectangle (190 cm width, 90 cm height). Continuing with the previous example, in response to detecting a 30 cm movement from the left edge of the trackpad 346 to the right edge of the trackpad 346, the electronic device 310 maps from the left edge of the content manipulation region 340 to the right edge of the content manipulation region 340. Accordingly, the electronic device 310 scales a 30 cm movement (associated with the trackpad 346) to a 190 cm movement (associated with the content manipulation region 340) in order to properly map movements associated with the trackpad 346 to the content manipulation region 340.

As illustrated in FIG. 3J, the electronic device 310 detects a selection input 349 directed to the first trackpad manipulation affordance 346a. In some implementations, as illustrated in FIG. 3K, the electronic device 310 displays, on the display 312, a gray overlay within the first trackpad manipulation affordance 346a indicating selection of the first trackpad manipulation affordance 346a. Moreover, the electronic device 310 detects a drag input 350 that requests a rightwards movement of the trackpad 346. Accordingly, based on the drag input 350, the electronic device 310 repositions the trackpad 346, as illustrated in FIG. 3L.

As illustrated in FIG. 3M, the electronic device 310 detects a second movement 352 of the paired electronic device 330 within the trackpad 346. The second movement 352 corresponds to a leftwards movement across the surface of the physical table 306. Based on detecting the second movement 352 and based on a mapping between the trackpad 346 and the content manipulation region 340, the electronic device 310 performs a second content manipulation operation with respect to the content manipulation region 340. For example, as illustrated in FIG. 3N, the electronic device 310 displays, on the display 312, a second drawing mark 354 based on the second movement 352.

According to various implementations, the electronic device 310 ceases to display the trackpad 346 based on detecting a trackpad dismissal request. The trackpad dismissal request may be initiated based on an eye gaze change, a gesture performed on the paired input device 330 (e.g., a double tap on the paired input device 330), a movement of the paired input device 330, etc. For example, as illustrated in FIG. 3O, the paired input device 330 lifts off of the surface of the physical table 306, as indicated by liftoff line 356.

Based on detecting the liftoff of the paired input device 330, the electronic device 310 ceases to display the trackpad 346, as illustrated in FIG. 3P. For example, based on pressure sensor data from the paired input device 330 indicating that a pressure level falls below a threshold, the electronic device 310 ceases to display the trackpad 346. As another example, based on proximity sensor data from the paired input device 330 indicating that a distance between the paired input device 330 and a physical surface is above a threshold, the electronic device 310 ceases to display the trackpad 346. As yet another example, based on performing computer vision independent of sensor data from the paired input device 330, the electronic device 310 determines that a distance between the paired input device 330 and the surface of the physical table 306 is above a threshold, and accordingly ceases to display the trackpad 346.

Subsequently, as illustrated in FIG. 3Q, the left eye 56 of the user 50 is focused on a second portion 357 of the operating environment 300. Based on eye tracking data, the electronic device 310 determines a second gaze position 358 within the content manipulation region 340. The second gaze position 358 is near the upper right corner of the content manipulation region 340.

According to various implementations, the electronic device 310 determines an offset position relative to a selection point, based on a gaze position. Moreover, the electronic device 310 sets a placement location (e.g., corresponding to the center of a trackpad) based on the offset position. Accordingly, the electronic device 310 may offset the center of the trackpad 346 from a selection point, based on where a user is gazing within a content manipulation region.

To that end, in some implementations, the electronic device 310 determines a first vector, within a content manipulation region, that intersects with the gaze position. Moreover, the electronic device 310 determines, based in part on the first vector, a second vector that intersects with the placement location. For example, as illustrated in FIG. 3R, the electronic device 310 determines a first vector 359 that intersects with the second gaze position 358. The first vector 359 may originate at the center of the content manipulation region 340, and may terminate at the second gaze position 358. Moreover, based on spatial selector data, the electronic device 310 determines a second selection point 362 on the surface of the physical table 306, and determines a second vector 363 based on the first vector 359. The second vector 363 intersects with the second selection point 362. For example, the second vector 363 originates at the second selection point 362, and terminates at a second placement location 364 associated with the trackpad 346, as illustrated in FIG. 3S. In some implementations, determining the second vector 363 based on the first vector 359 includes negating the first vector 359. For example, the first vector 359 points up and to the right within the content manipulation region 340 (at approximately 45 degrees), and the electronic device 310 negates the first vector 359 in order to determine that the second vector 363 points down and to the left within the trackpad 346 (at approximately 45 degrees). Moreover, in some implementations, based on a difference in size (e.g., area) between the content manipulation region 340 and the trackpad 346, the electronic device 310 scales the negated first vector 359 based on the size difference, in order to determine the second vector 363. Thus, because the user 50 is gazing near the upper right corner of the content manipulation region 340, the electronic device 310 places the trackpad 346 such that second selection point 362 is likewise positioned near the upper right corner of the trackpad 346.

As illustrated in FIG. 3T, the electronic device 310 detects a third movement 365 of the paired electronic device 330 within the trackpad 346. The third movement 365 corresponds to a leftwards movement across the surface of the physical table 306. Based on detecting the third movement 365 and based on a mapping between the trackpad 346 and the content manipulation region 340, the electronic device 310 performs a third content manipulation operation with respect to the content manipulation region 340. For example, as illustrated in FIG. 3U, the electronic device 310 displays, on the display 312, a third drawing mark 366 based on the third movement 365.

FIGS. 4A-4J are examples of utilizing a computer-generated representation of a trackpad ("trackpad") to manipulate respective content within corresponding content manipulation regions in accordance with some implementations.

Figure 4A:
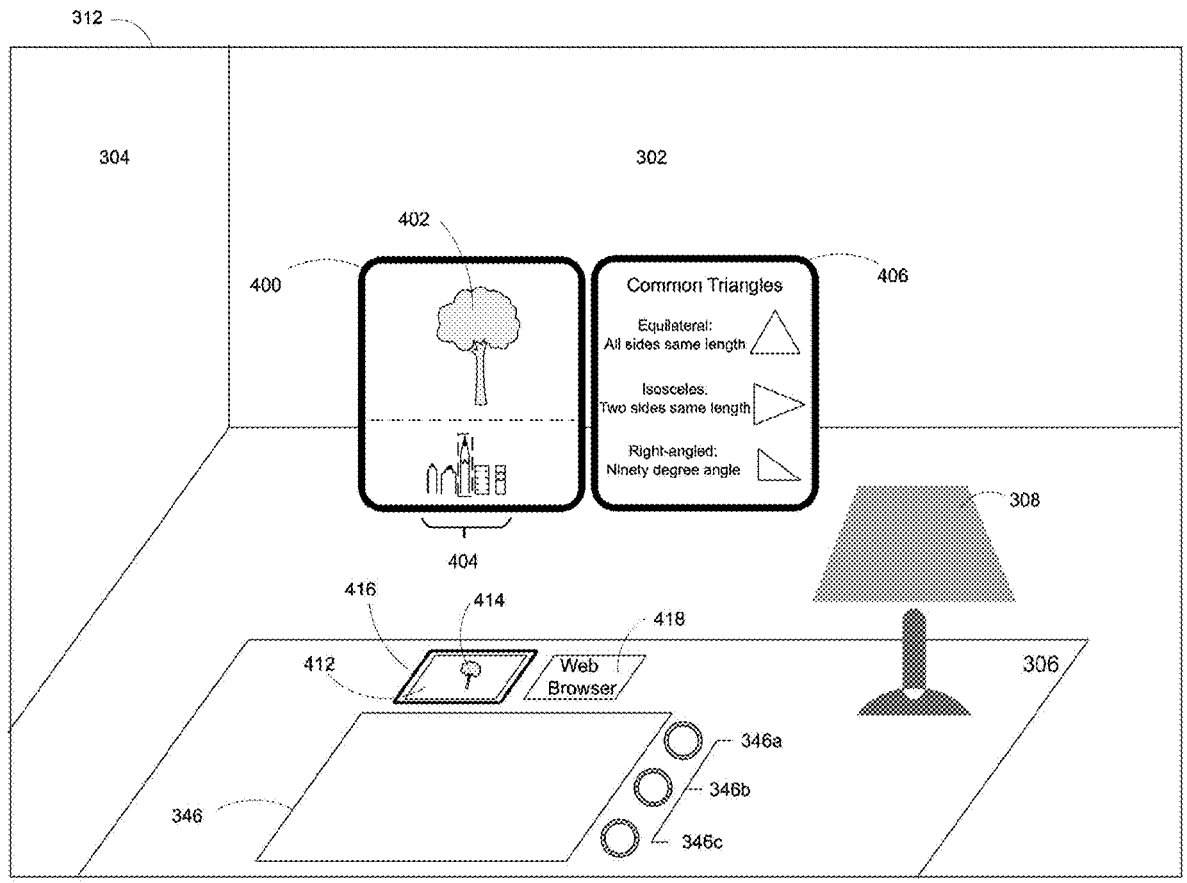
FIGS. 4A-4J are examples of utilizing a computer-generated representation of a trackpad to manipulate respective content within corresponding content manipulation regions in accordance with some implementations.

As illustrated in FIG. 4A, the electronic device 310 continues to operate according to the operating environment 300, and thus electronic device 310 maintains displays of the respective representations of the first physical wall 302, the second physical wall 304, the physical table 306, and the physical lamp 308. Moreover, the electronic device 310 maintains display of the trackpad 346 and the trackpad manipulation affordances 346a-346c on the surface of the physical table 306.

Moreover, the electronic device 310 displays, on the display 312, a plurality of content manipulation regions including a first content manipulation region 400 and a second content manipulation region 406. The first content manipulation region 400 includes various drawing content, including a tree 402, as well as drawing tool affordances 404 for manipulating the drawing content. For example, the first content manipulation region 400 includes a drawing canvas associated with a drawing application. The second content manipulation region 406 includes various content relating to triangles. For example, the second content manipulation region 406 corresponds to a webpage that includes basic information about triangles. One of ordinary skill in the art will appreciate that, at any given time, each of the plurality of content manipulation regions may include any type of content, or no content.

Moreover, the electronic device 310 displays, on the display 312, a plurality of affordances respectively associated with the plurality of content manipulation regions. The plurality of affordances includes a first affordance 412 associated with the first content manipulation region 400, and a second affordance 418 associated with the second content manipulation region 406. In some implementations, each of the plurality of affordances is associated with an application. For example, the first affordance 412 is associated with a drawing application, and the second affordance 418 is associated with a web browser application.

In some implementations, a particular affordance includes a representation of content within a corresponding content manipulation region. For example, the first affordance 412 includes a reduced-size representation 414 of the tree 402.

In some implementations, a particular affordance includes content that indicates the corresponding application. For example, the second affordance 418 includes text that indicates that the corresponding application is a "Web Browser." As another example, in some implementations, a particular affordance includes an application icon representing an application.

According to various implementations, as will be described below, in response to detecting selection of a particular affordance, the electronic device 310 associates the trackpad 346 with a corresponding content manipulation region. As illustrated in FIG. 4A, the electronic device 310 displays, on the display 312, a first selection indicator 416 indicating that the trackpad 346 is currently associated with the first content manipulation region 400. The first selection indicator 416 corresponds to an overlay that surrounds the first affordance 412, however one of ordinary skill in the art will appreciate that a selection indicator may distinguish a corresponding affordance in any number of ways, including but not limited to displaying an overlay inside the affordance, highlighting the affordance, enlarging the affordance, de-emphasizing (e.g., fading out) other affordances, etc. Additionally, a selection indicator may similarly be applied to the selected content manipulation region (e.g., 400 or 406).

Figure 4B:
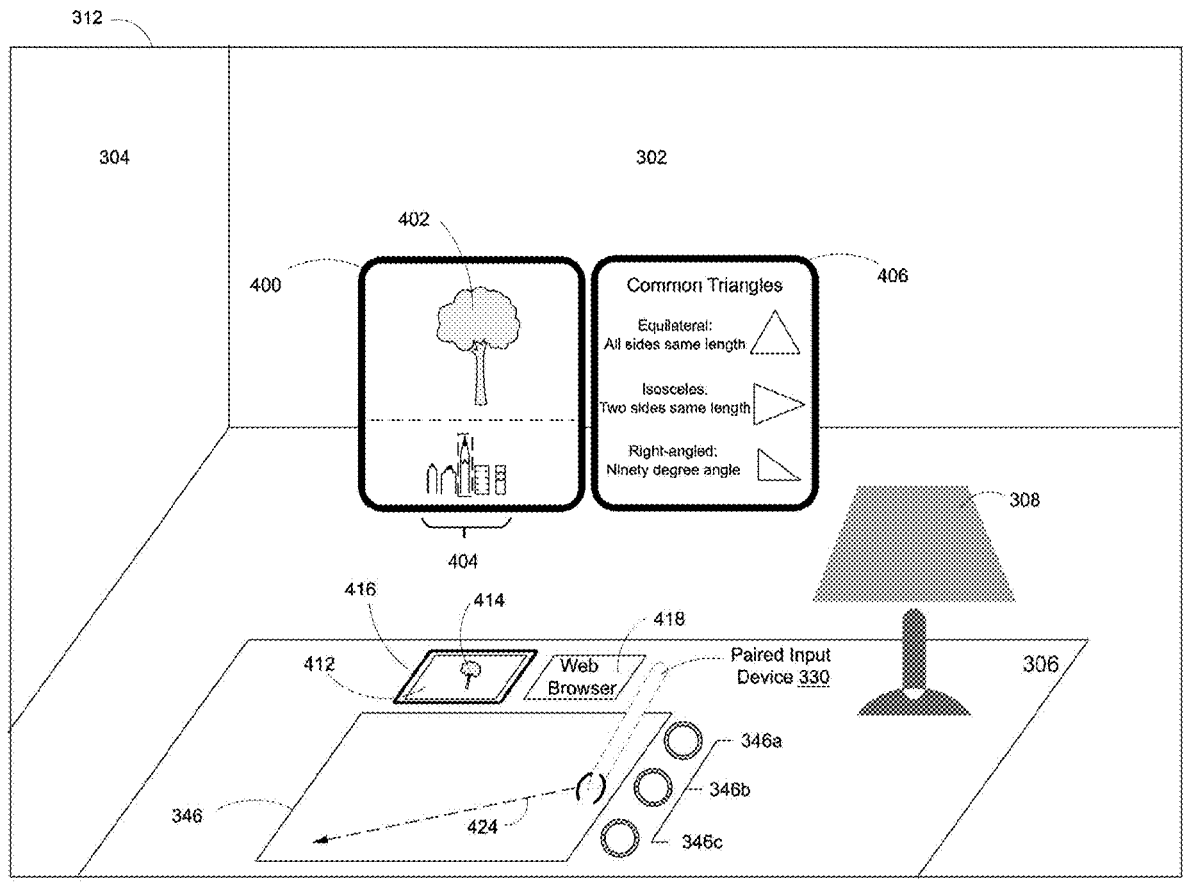

As illustrated in FIG. 4B, the electronic device 310 detects a fourth movement 424 of the paired input device 330 across the trackpad 346. To that end, the electronic device 310 includes the spatial selector tracker described above. For example, the spatial selector tracker detects the fourth movement 424 based on computer vision and/or sensor data (e.g., IMU data, pressure sensor data, proximity sensor data, etc.) from the paired input device 330. Although the examples described with reference to FIGS. 4B-4I include various inputs provided by the paired input device 330, one of ordinary skill in the art will appreciate that, in some implementations, instead of or in addition to the paired input device 330 providing inputs, an extremity of the user 50 (e.g., a finger of the left hand 54) provides inputs. For example, the spatial selector tracker tracks the extremity by performing computer vision with respect to image data from a camera.

Figure 4C:
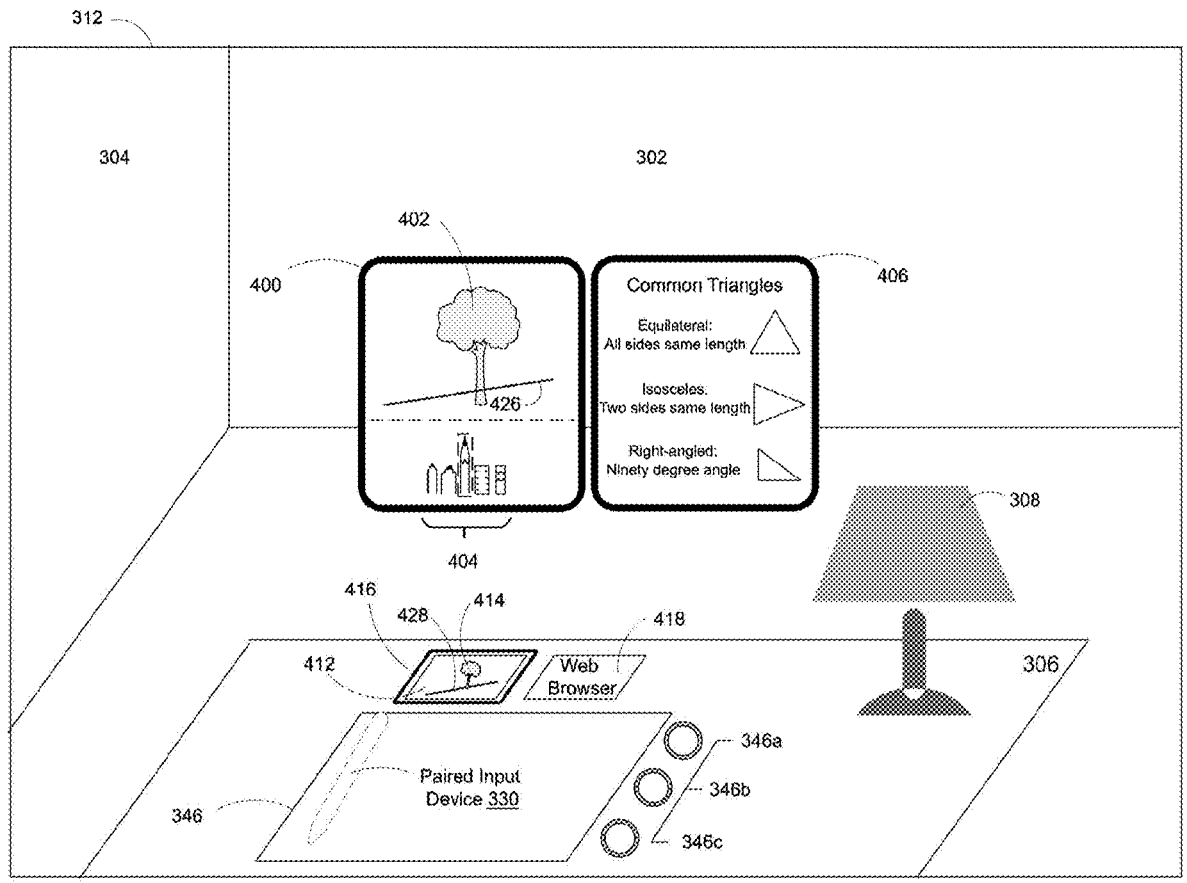

In response to detecting the fourth movement 424, the electronic device 310 displays, on the display 312, a fourth drawing mark 426 based on the fourth movement 424 as illustrated in FIG. 4C. The fourth drawing mark 426 is displayed within the first content manipulation region 400 because the first content manipulation region 400 is currently associated with the trackpad 346. Moreover, because the pencil drawing affordance, of the drawing tool affordances 404, is currently selected, the fourth drawing mark 426 corresponds to a pencil mark. In order to determine the location of the fourth drawing mark 426, the electronic device 310 determines a mapping between the fourth movement 424 (within the trackpad 346) and a corresponding portion of the first content manipulation region 400. In some implementations, the electronic device 310 updates content within the first affordance 412 based on the fourth movement 424. For example, the electronic device 310 displays, within the first affordance 412, a representation 428 of the fourth drawing mark 426.

Figure 4D:
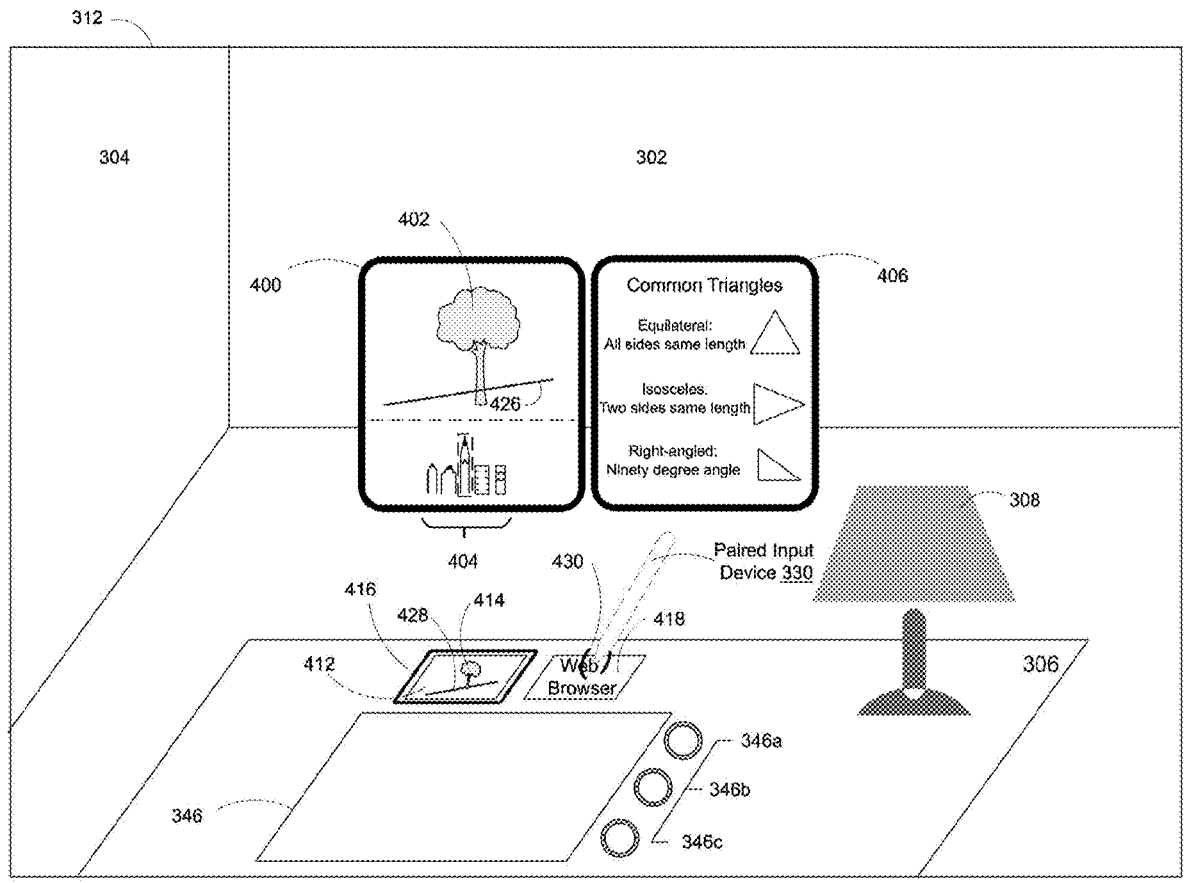
Figure 4E:
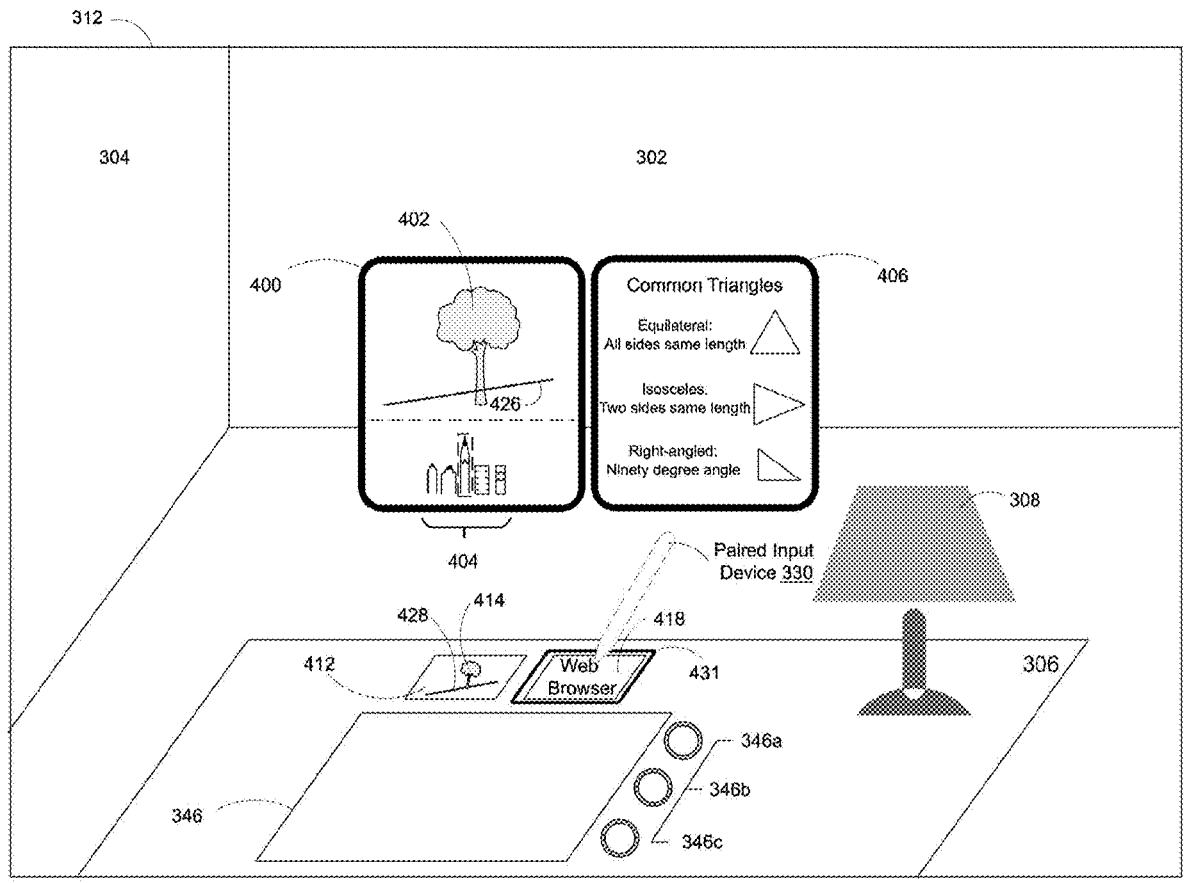

As illustrated in FIG. 4D, the electronic device 310 detects a first input 430 directed to within the second affordance 418. For example, the first input 430 corresponds to a tap or double tap within the second affordance 418. In response to detecting the first input 430, the electronic device 310 associates the trackpad 346 with the second content manipulation region 406, and dissociates the trackpad 346 with the first content manipulation region 400. In some implementations, based on detecting the first input 430, the electronic device 310 moves focus from the first affordance 412 to the second affordance 418. For example, as illustrated in FIG. 4E, the electronic device 310 displays a second selection indicator 431 surrounding the second affordance 418, and ceases to display the first selection indicator 416. The second selection indicator 431 indicates the association between the trackpad 346 and the second content manipulation region 406. Additionally, a selection indicator may similarly be moved from the first content manipulation region 400 to the second content manipulation region 406.

Figure 4F:
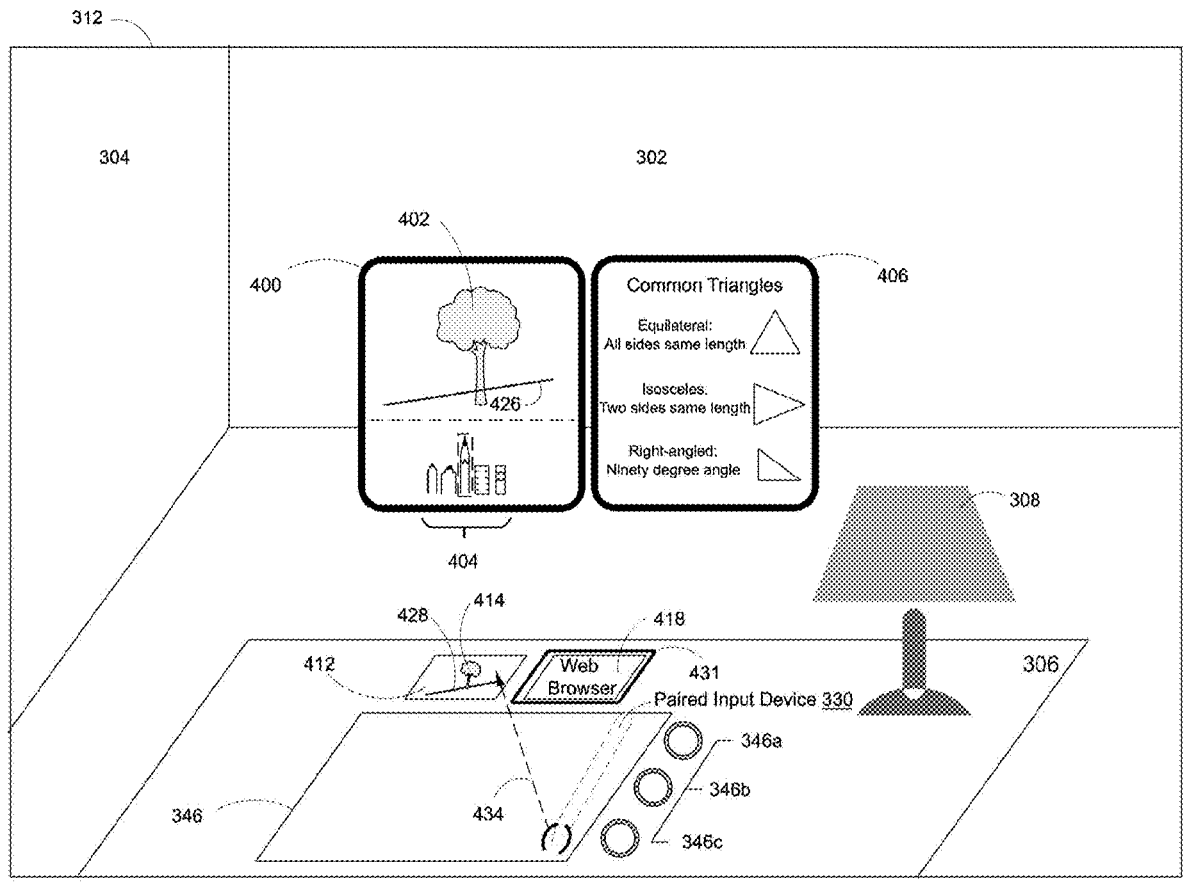

FIGS. 4F-4I illustrate an example of a drag and drop movement of content between content manipulation regions. For example, the drag and drop movement initiates a copy and paste of the content between the content manipulation regions. As illustrated in FIG. 4F, the electronic device 310 begins to detect a fifth movement 434 across the trackpad 346. In response to detecting the initial contact point of the fifth movement 434, the electronic device 310 determines a mapping between the initial contact point and a corresponding point within the second content manipulation region 406. Namely, based on the initial contact point being near the bottom right corner of the trackpad 346, the mapping indicates the right-angled triangle that is likewise near the bottom right corner of the second content manipulation region 406.

Figure 4G:
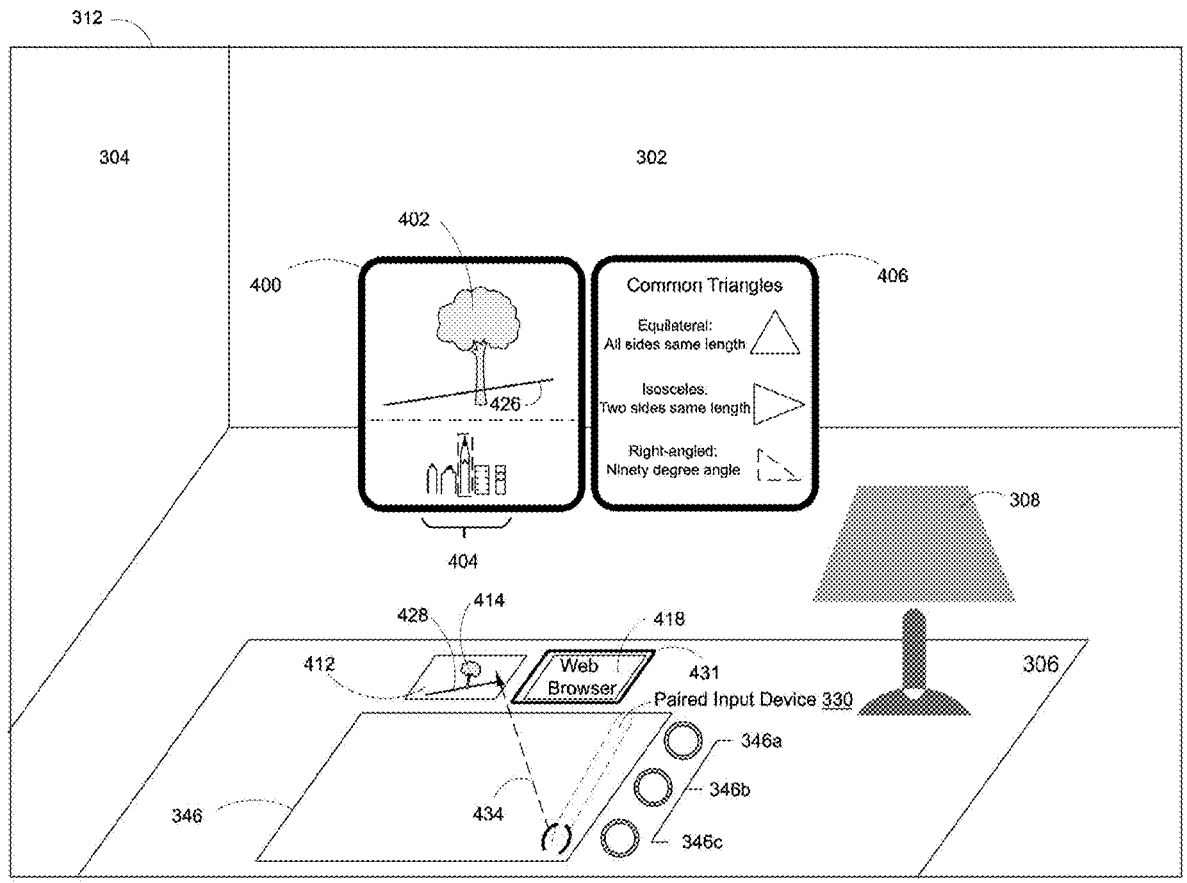

In some implementations, based on the mapping, the electronic device 310 selects the right-angled triangle. Moreover, in some implementations, based on the mapping, the electronic device 310 visually distinguishes a selected object from other objects. For example, as illustrated in FIG. 4G, the electronic device 310 changes the right-angled triangle from having a solid line boundary to a dotted-line boundary. Visually distinguishing a selected object provides feedback to the user 50 that the selected object can be used as part of a drag and drop movement.

Figure 4H:
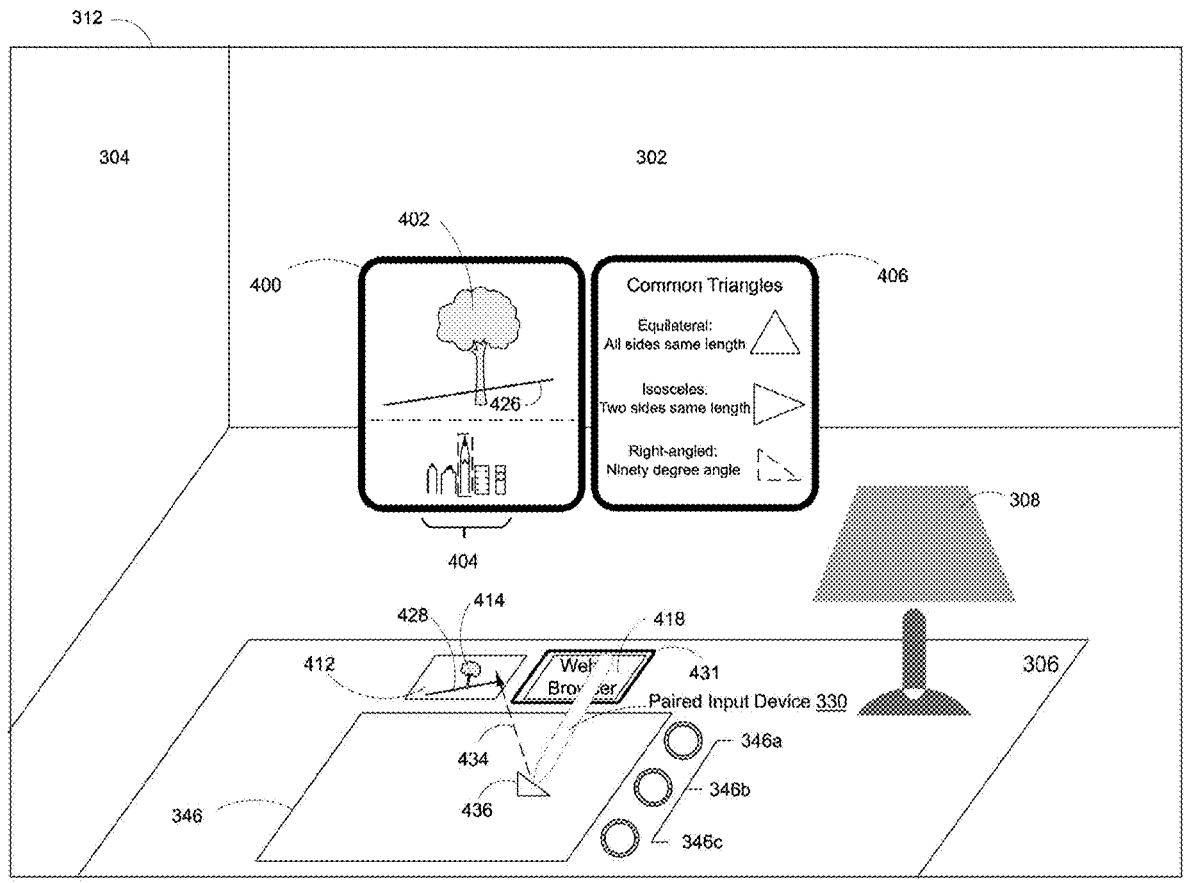

As illustrated in FIG. 4H, the fifth movement 434 proceeds towards the first affordance 412. In some implementations, as the fifth movement 434 proceeds, the electronic device 310 displays a representation of the drag and drop content. For example, the electronic device 310 displays a (e.g., reduced-size) representation 436 of the right-angled triangle that follows the fifth movement 434. The representation 436 provides further feedback to the user 50 regarding which object is being pasted as part of the fifth movement 434.

Figure 4I:
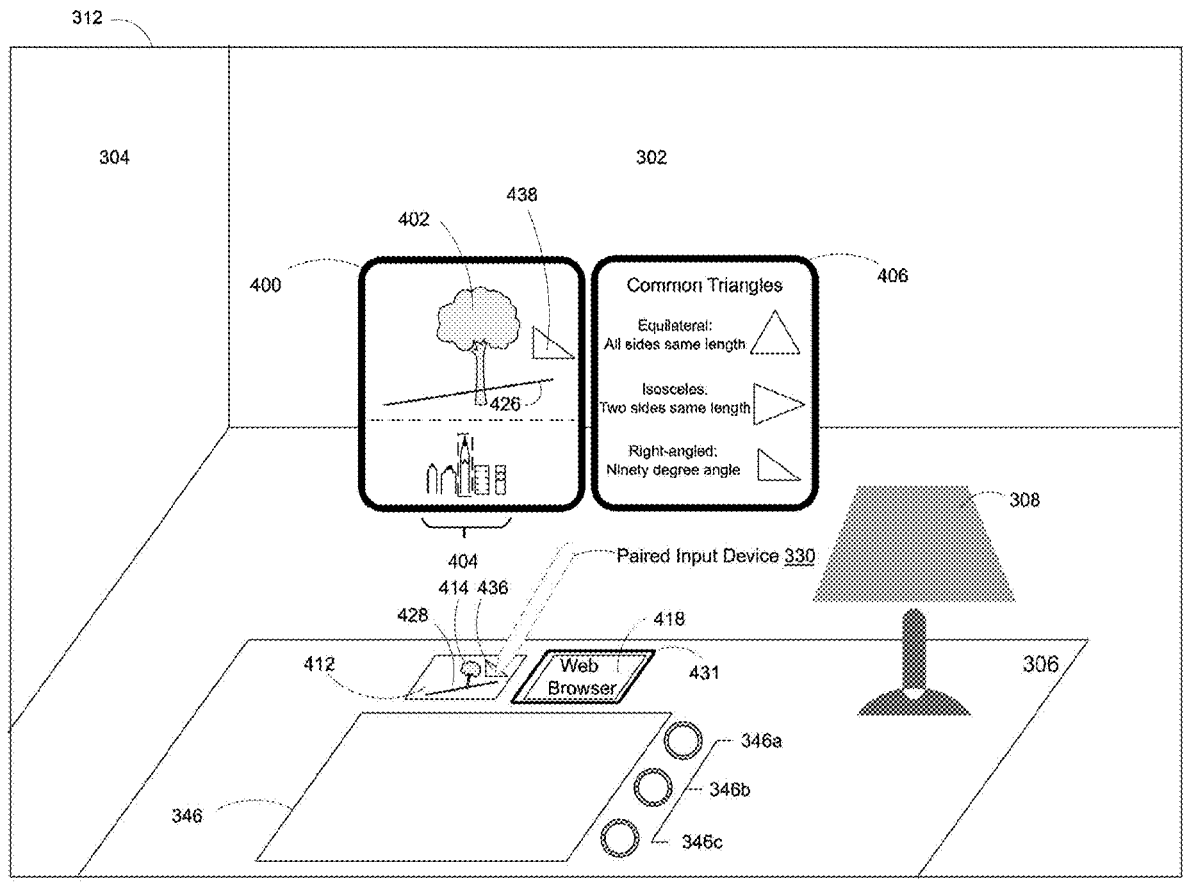

As illustrated in FIG. 4I, the fifth movement 434 terminates within the first affordance 412. In response to detection of the termination of the fifth movement 434, the electronic device 310 displays, within the first content manipulation region 400, a copied right-angled triangle 438. The copied right-angled triangle 438 corresponds to the right-angled triangle within the second content manipulation region 406. In some implementations, the position of the copied right-angled triangle 438 within the first content manipulation region 400 is based on the termination point of the fifth movement 434 within the first affordance 412. Namely, the termination point is near the upper right corner of the first affordance 412, and accordingly the electronic device 310 places the copied right-angled triangle 438 near the upper right corner of the first content manipulation region 400.

Moreover, in some implementations, the electronic device 310 updates content within the first affordance 412 based on the termination of the fifth movement 434. Namely, as illustrated in FIG. 4I, the electronic device 310 displays, within the first affordance 412, the representation 436 of the right-angled triangle.

Figure 4J:
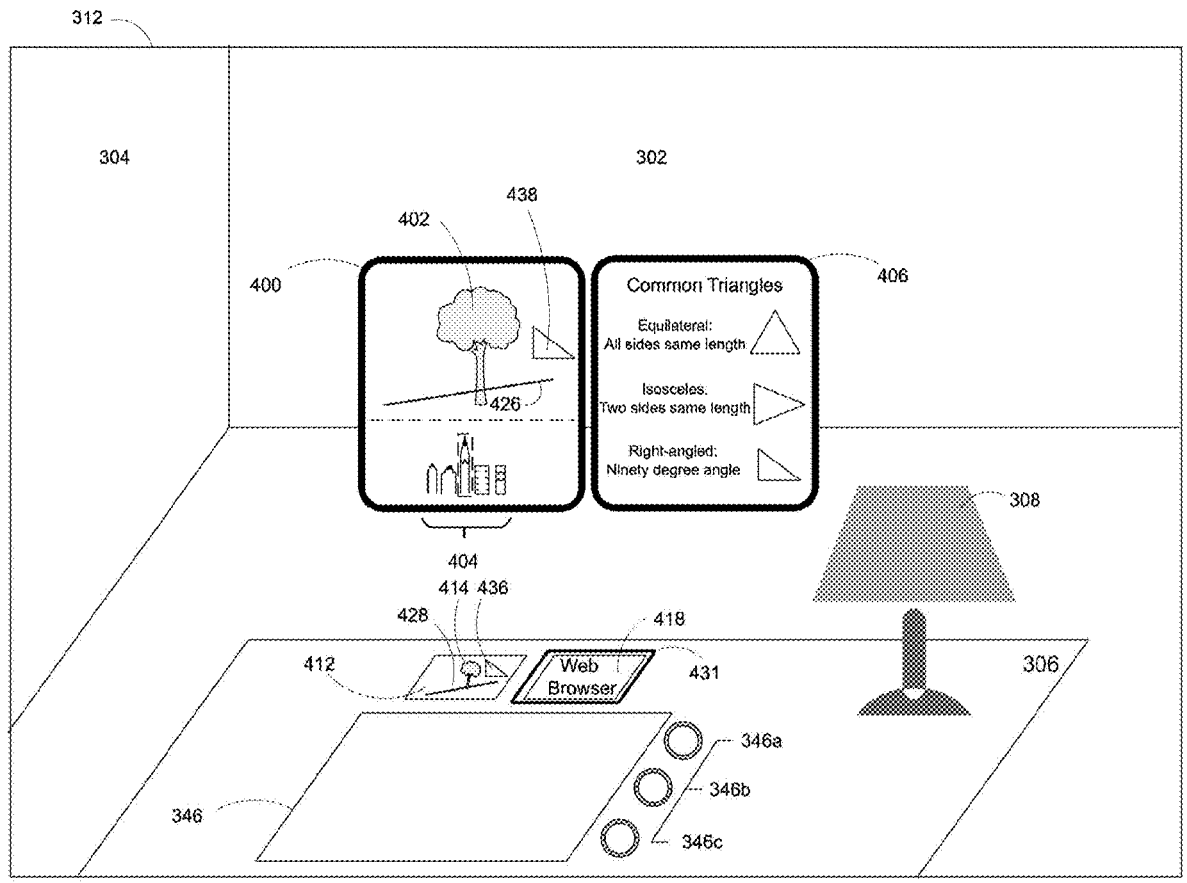

As illustrated in FIG. 4J, the electronic device 310 maintains display of the fourth drawing mark 426, the representation 428 of the fourth drawing mark 426, the copied right-angled triangle 438, and the representation 436 of the right-angled triangle, despite ceasing to detect the paired input device 330 on the display 312.

Figure 5:
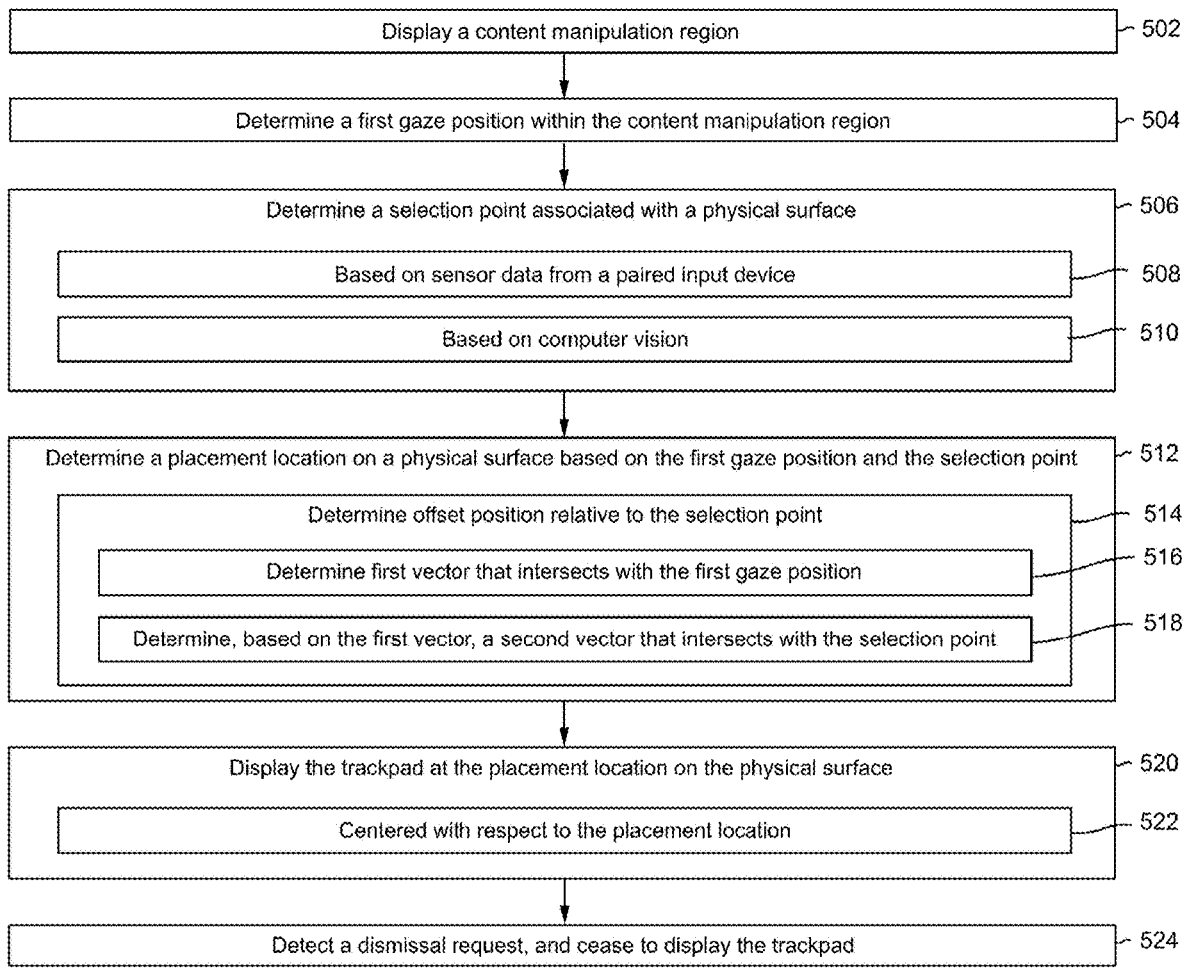
FIG. 5 is an example of a flow diagram of a method of positioning a computer-generated representation of a trackpad based on eye tracking data and spatial selector data in accordance with some implementations.

FIG. 5 is an example of a flow diagram of a method 500 of positioning a computer-generated representation of a trackpad ("trackpad") based on eye tracking data and spatial selector data in accordance with some implementations. In various implementations, the method 500 or portions thereof are performed by an electronic device (e.g., the electronic device 100 in FIG. 1 or the electronic device 310 in FIGS. 3A-3U). In various implementations, the method 500 or portions thereof are performed by a head-mountable device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes displaying a content manipulation region, such as the content manipulation region 340 illustrated in FIG. 3D. In some implementations, the content manipulation region is associated with an application and thus includes content associated with the application. For example, the content manipulation region is associated with a drawing application, and thus the content manipulation region includes a drawing canvas and drawing tool affordances (e.g., pencil, pen, eraser) for manipulating content within the drawing canvas.

As represented by block 504, while displaying the content manipulation region, the method 500 includes determining a first gaze position within the content manipulation region based on eye tracking data from an eye tracker. For example, with reference to FIG. 3D, based on the eye tracking data, the electronic device 310 determines the first gaze position 341 at approximately the center of the content manipulation region 340.

As represented by block 506, while displaying the content manipulation region, the method 500 includes determining a selection point associated with a physical surface, based on spatial selector data from a spatial selector tracker. The spatial selector data may indicate a position of a paired input device or an extremity of a user. Thus, the spatial selector tracker may track an extremity (e.g., a finger) or a paired input device (e.g., stylus, finger-wearable device, etc.). In some implementations, the spatial selector data indicates a three-dimensional (3D) position within an operating environment. For example, as illustrated in FIGS. 3E and 3F, the electronic device 310 tracks the movement of the paired input device 330 towards the surface of the physical table 306. Based on the tracking, the electronic device 310 determines the first selection point 344 on the surface of the physical table 306, as illustrated in FIG. 3F. In some implementations, determination of a selection point is in response to determining that a paired input device or an extremity of a user is less than a threshold distance from the physical surface.

As represented by block 508, in some implementations, the spatial selector data includes sensor data from a paired input device, such as pressure sensor data or proximity sensor data. To that end, in some implementations, an electronic device includes a communication interface (e.g., the communication interface 190 of FIG. 1) provided to communicate with the paired input device. The electronic device receives the sensor data from the paired input device via the communication interface.

As represented by block 510, in some implementations, the spatial selector data is generated via a computer vision technique, and may be independent of sensor data. To that end, in some implementations, an electronic device includes an image sensor, and the electronic device identifies an extremity within image data from the image sensor. For example, the computer vision technique includes semantic segmentation, optionally with the aid of a neural network.

As represented by block 512, in some implementations, the method 500 includes determining a placement location on the physical surface. The placement location is based on the first gaze position and the selection point. For example, with reference to FIG. 3G, the electronic device 310 determines the first placement location 345 based on the first gaze position 341 and the first selection point 344. Namely, because the first gaze position 341 is at approximately the center of the content manipulation region 340, the first placement location 345 is such that the first selection point 344 is likewise at approximately the center of the trackpad 346.

As represented by block 514, in some implementations, the 500 includes setting the placement location to an offset position. To that end, the method 500 includes determining the offset position relative to the selection point, based on the first gaze position. For example, as represented by block 516, determining the offset position includes determining a first vector, within the content manipulation region, that intersects with the first gaze position. Moreover, as represented by block 518, the method 500 includes determining, based in part on the first vector, a second vector within the trackpad. The second vector intersects with the selection point. For example, as illustrated in FIG. 3R, the electronic device 310 determines the first vector 359, which intersects with the second gaze position 358 within the content manipulation region 340. Moreover, the electronic device 310 determines the second vector 363 based on the first vector 359. The second vector 363 intersects with the second selection point 362 within the trackpad 346, as illustrated in FIG. 3S. For example, the first vector 359 originates at the center of the content manipulation region 340 and terminates at the second gaze position 358, and the second vector 363 originates at the second selection point 362 and terminates at the second placement location 364. In some implementations, determining the second vector based in part on the first vector includes negating (and optionally scaling) the first vector. For example, with reference to FIG. 3R, the first vector 359 points upwards and rightwards (at approximately 45 degrees), and thus the electronic device 310 negates the first vector 359 in order to determine the second vector 363. Based on the negation, the second vector 363 points downwards and leftwards (at approximately 45 degrees). Moreover, the second vector 363 may be a scaled version (e.g., larger or smaller magnitude) of the first vector 359, based on respective sizes of the content manipulation region 340 and the trackpad 346. For example, when the trackpad 346 is a two foot×two foot square, and the content manipulation region 340 is a four foot×four foot square, the second vector 363 is half the magnitude of the first vector 359.

As represented by block 520, the 500 includes displaying the trackpad at the placement location on the physical surface. As represented by block 522, in some implementations, the trackpad is displayed substantially centered with respect to the placement location. For example, the electronic device 310 displays the trackpad 346 substantially centered with respect to the first placement location 345 and the second placement location 364, as respectively illustrated in FIGS. 3G and 3S.

In some implementations, the trackpad includes the first selection point. For example, as illustrated in FIGS. 3G, the trackpad 346 includes the first selection point 345. With continued reference to FIG. 3G, although the display 312 includes respective indicators (reticles) for the first gaze position 341, the first selection point 344, and the first placement location 345, in some implementations the display 312 does not include some or all of these indicators.

As represented by block 524, in some implementations, the 500 includes, while displaying the trackpad, detecting a trackpad dismissal request, and in response to detecting the trackpad dismissal request, ceasing to display the trackpad.

For example, in some implementations, detecting the trackpad dismissal request includes determining, based on the spatial selector data, that an extremity is more than a threshold distance above the trackpad on the physical surface. As one example, as illustrated in FIG. 3O, the paired input device 330 lifts off of the surface of the physical table 306, as indicated by liftoff line 356. Based on detecting the liftoff of the paired input device 330, the electronic device 310 ceases to display the trackpad 346, as illustrated in FIG. 3P.

As another example, in some implementations, the trackpad dismissal request is based on a gaze movement to a location outside of the content manipulation region. To that end, the method 500 includes determining, based on the eye tracking data, a change from the first gaze position to a second gaze position. Moreover, detecting the trackpad dismissal request includes determining that the second gaze position is more than a threshold distance outside of the content manipulation region. In some implementations, detecting the trackpad dismissal request further includes determining that the second gaze position is more than the threshold distance outside of the content manipulation region, for at least a threshold amount of time.

As yet another example, in some implementations, the trackpad dismissal request is based on a gesture performed on a paired input device. For example, detecting the trackpad dismissal request includes determining that the gesture corresponds to a trackpad dismissal gesture, such as a tap or double tap gesture performed on a stylus. The gesture may be detected based on sensor data from the paired input device via the communication interface, such as touch data indicating that a user is performing a double tap gesture.

Figure 6:
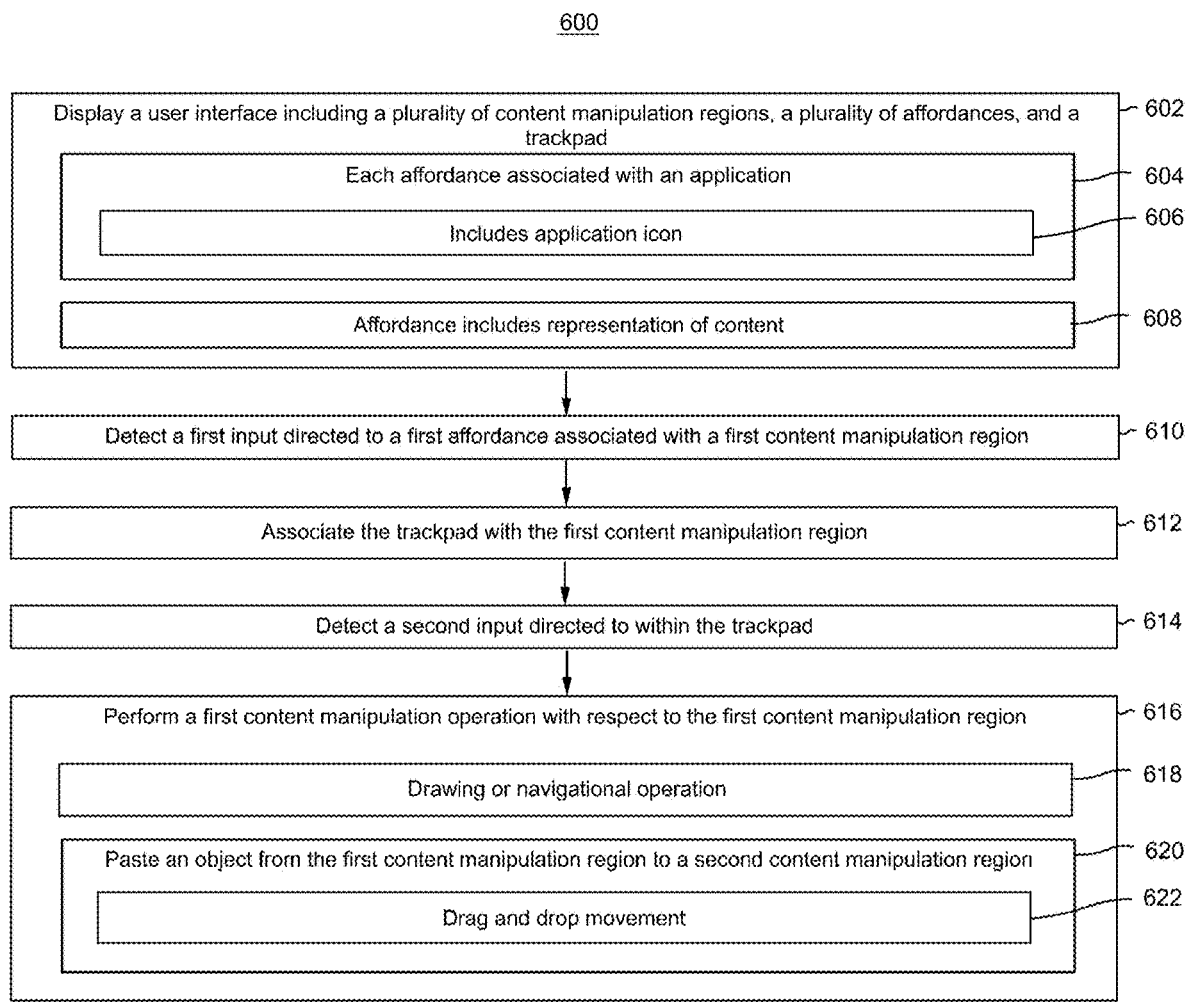
FIG. 6 is an example of a flow diagram of a method of utilizing a computer-generated representation of a trackpad to manipulate respective content within corresponding content manipulation regions in accordance with some implementations.

FIG. 6 is an example of a flow diagram of a method 600 of utilizing a computer-generated representation of a trackpad ("trackpad") to manipulate respective content within corresponding content manipulation regions in accordance with some implementations. In various implementations, the method 600 or portions thereof are performed by an electronic device (e.g., the electronic device 100 in FIG. 1 or the electronic device 310 in FIGS. 4A-4J). In various implementations, the method 600 or portions thereof are performed by an HMD. In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As represented by block 602, the method 600 includes displaying a user interface that includes a plurality of content manipulation regions, a plurality of affordances respectively associated with the plurality of content manipulation regions, and a trackpad associated with a physical surface. For example, with reference to FIG. 4A, the electronic device 310 displays, on the display 312, the first content manipulation region 400 and the second content manipulation region 406, the first affordance 412 associated with the first content manipulation region 400, the second affordance 418 associated with the second content manipulation region 406, and the trackpad 346. In some implementations, the plurality of affordances is proximate to the computer-generated representation of the trackpad.

As represented by block 604, in some implementations, each of the plurality of affordances is associated with an application. The plurality of affordances may be associated with a common application or different applications. For example, a first affordance is associated with a first webpage of a particular web browser application, and a second affordance is associated with a second webpage of the particular web browser application. As another example, as represented by block 604 and with reference to FIG. 4A, the first affordance 412 is associated with a drawing application, and the second affordance 418 is associated with a web browser application.

As represented by block 606, in some implementations, a particular affordance includes an application icon that indicates a corresponding application. For example, a particular affordance includes a pencil icon to indicate a drawing application. As another, with reference to FIG. 4B, the second affordance 418 includes "Web Browser" text to indicate that the second affordance 418 is associated with a web browser application.

As represented by block 608, in some implementations, a particular affordance includes a representation of content within a corresponding content manipulation region. For example, with reference to FIG. 4A, the first affordance 412 includes a reduced-size representation 414 of the tree 402, wherein the tree 402 is content displayed within the first content manipulation region 400.

As represented by block 610, the method 600 includes, while displaying the user interface, detecting, via a spatial selector tracker, a first input directed to a first affordance of the plurality of affordances. The first affordance is associated with a first content manipulation region of the plurality of content manipulation regions. For example, with reference to FIG. 4D, the electronic device 310 detects a first input 430 directed to within the second affordance 418, which is associated with the second content manipulation region 406. To that end, in some implementations, the spatial selector tracker uses a combination of computer vision and sensor data from a paired input device (e.g., proximity sensor data, pressure sensor data, IMU data) in order to track a position of an extremity or the paired input device. Based on the tracking, an electronic device determines when the extremity or the paired input device contacts an affordance or is less than a threshold distance from the affordance, and accordingly determines that the extremity/paired input device is within the affordance. For example, the spatial selector tracker performs three-dimensional (3D) tracking in order to determine that the extremity/paired input device is within the affordance.

As represented by block 612, the method 600 includes, in response to detecting the first input, associating the computer-generated representation of the trackpad with the first content manipulation region. For example, in response to detecting the first input 430 directed to within the second affordance 418 in FIG. 4D, the electronic device 310 associates the trackpad 346 with the second content manipulation region 406 in FIG. 4E. Moreover, in some implementations, in response to detecting the first input 430 directed to within the second affordance 418, the electronic device 310 dissociates the trackpad 346 with the first content manipulation region 400, which was previously associated with the trackpad 346.

In some implementations, in further response to receiving the first input, the method 600 includes displaying a selection indicator that is indicative of the association of the trackpad with the first content manipulation region. For example, displaying the selection indicator includes placing focus on the first affordance, or otherwise distinguishing the first affordance from the other affordances. As one example, based on detecting the first input 430 in FIG. 4D, the electronic device 310 moves focus from the first affordance 412 to the second affordance 418 in FIG. 4E. Namely, the electronic device 310 ceases to display the first selection indicator 416 (overlay around the first affordance 412), and displays the second selection indicator 431 (overlay around the second affordance 418).

As represented by block 614, in some implementations, while the trackpad is associated with the first content manipulation region, the method 600 includes detecting, via the spatial selector tracker, a second input directed to within the trackpad. Moreover, as represented by block 616, in response to detecting the second input, the method 600 includes performing a first content manipulation operation with respect to the first content manipulation region according to the second input.

As represented by block 618, in some implementations, the first content manipulation operation includes a drawing operation or a navigational operation. For example, in response to detecting the fourth movement 424 in FIG. 4B, the electronic device 310 displays, on the display 312, the fourth drawing mark 426 in FIG. 4C. As another example, the navigational operation includes scrolling through webpage content within a content manipulation region, navigating a menu within a content manipulation region, etc.

As represented by block 620, in some implementations, the first content manipulation operation includes pasting an object from the first second content manipulation region to a second content manipulation region of the plurality of content manipulation region.

In some implementations, a user input selects an object within the first content manipulation region, and performs a gesture in order to paste the object to the second content manipulation region. For example, a paired input device contacts a center of a trackpad, and an electronic device determines a mapping from the center of the trackpad to a thumbnail of a coffee mug within the first content manipulation region. Accordingly, the electronic device selects the thumbnail of the coffee mug. Subsequently, based on detecting a certain gesture type (e.g., a double tap on the paired input device), the electronic device pastes the thumbnail of the coffee mug to the second content manipulation region.

As another example, as represented by block 622, pasting of the object is initiated by a drag and drop movement. For example, with reference to FIGS. 4F-4I, the electronic device 310 detects the fifth movement 434. The fifth movement 434 corresponds to a drag and drop of the right-angled triangle to within the first affordance 412. Namely, the fifth movement 434 begins at a location within the trackpad 346 that maps to the right-angled triangle, and terminates within the first affordance 412, which is associated with the first content manipulation region 400. Accordingly, as illustrated in FIG. 4J, the electronic device 310 pastes the copied right-angled triangle 438 to the first content manipulation region 400. In some implementations, the location of the copied right-angled triangle 438 within the first content manipulation region 400 is based on the termination point of the fifth movement 434 within the first affordance 412. In some implementations, as illustrated in FIG. 4H, while detecting the fifth movement 434, the method 600 includes displaying a representation 436 of the right-angled triangle that follows the fifth movement 434.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The described technology may gather and use information from various sources. This information may in some instances, include personal information that identifies or may be used to locate or contact a specific individual. This personal information may include demographic data, location data, telephone numbers, email addresses, date of birth, social media account names, work or home addresses, data or records associated with a user's health or fitness level, or other personal or identifying information.

The collection, storage, transfer, disclosure, analysis, or other use of personal information should comply with well-established privacy policies or practices. Privacy policies and practices that are generally recognized as meeting or exceeding industry or governmental requirements should be implemented and used. Personal information should be collected for legitimate and reasonable uses and not shared or sold outside of those uses. The collection or sharing of information should occur after receipt of the user's informed consent.

It is contemplated that, in some instances, users may selectively prevent the use of, or access to, personal information. Hardware or software features may be provided to prevent or block access to personal information. Personal information should be handled to reduce the risk of unintentional or unauthorized access or use. Risk can be reduced by limiting the collection of data and deleting the data once it is no longer needed. When applicable, data de-identification may be used to protect a user's privacy.

Although the described technology may broadly include the use of personal information, it may be implemented without accessing such personal information. In other words, the present technology may not be rendered inoperable due to the lack of some or all of such personal information.

What is claimed is:

1. A method comprising:
    at an electronic device including a non-transitory memory, one or more processors, an eye tracker, a spatial selector tracker, and a display:
    displaying a content manipulation region on the display, wherein the content manipulation region comprises less than the entirety of the display;
    while displaying the content manipulation region on the display:
    determining a first gaze position within the content manipulation region based on eye tracking data from the eye tracker;
    determining a selection point associated with a physical surface, based on spatial selector data from the spatial selector tracker; and
    displaying, on the display, a computer-generated representation of a trackpad at a placement location on the physical surface, wherein the placement location is based on the first gaze position and the selection point.

2. The method of claim 1, wherein the spatial selector tracker includes a communication interface provided to communicate with a paired input device, wherein the spatial selector data includes sensor data from the paired input device via the communication interface, and wherein determining the selection point is based at least in part on the sensor data.

3. The method of claim 2, wherein the sensor data includes positional data output from one or more positional sensors integrated in the paired input device.

4. The method of claim 2, wherein the sensor data includes pressure sensor data or proximity sensor data output from the paired input device.

5. The method of claim 1, wherein the electronic device includes an image sensor that outputs image data representing the physical surface, wherein the spatial selector tracker performs computer vision in order to identify an extremity within the image data, and wherein determining the selection point is based at least in part on the identification of the extremity within the image data.

6. The method of claim 1, wherein displaying the computer-generated representation of the trackpad is in response to determining, based on the spatial selector data, that an extremity is less than a threshold distance from the physical surface.

7. The method of claim 1, further comprising:
    determining an offset position relative to the selection point, based on the first gaze position; and
    setting the placement location to the offset position.

8. The method of claim 7, wherein determining the offset position includes:
    determining a first vector, within the content manipulation region, that intersects with the first gaze position; and determining, based in part on the first vector, a second vector within the computer-generated representation of the trackpad, wherein the second vector intersects with the selection point.

9. The method of claim 8, wherein the first vector originates at the center of the content manipulation region and terminates at the first gaze position, and wherein the second vector originates at the selection point and terminates at the placement location.

10. The method of claim 8, wherein determining the second vector based in part on the first vector includes negating the first vector.

11. The method of claim 1, wherein the computer-generated representation of the trackpad is displayed substantially centered with respect to the placement location.

12. The method of claim 1, further comprising:
while displaying the computer-generated representation of the trackpad, detecting a trackpad dismissal request; and
in response to detecting the trackpad dismissal request, ceasing to display the computer-generated representation of the trackpad.

13. The method of claim 12, wherein detecting the trackpad dismissal request includes determining, based on the spatial selector data, that an extremity is more than a threshold distance above the computer-generated representation of the trackpad on the physical surface.

14. The method of claim 12, further comprising determining, based on the eye tracking data, a change from the first gaze position to a second gaze position, and wherein detecting the trackpad dismissal request includes determining that the second gaze position is more than a threshold distance outside of the content manipulation region.

15. The method of claim 12, further comprising detecting a gesture performed on a paired input device, and wherein detecting the trackpad dismissal request includes determining that the gesture corresponds to a trackpad dismissal gesture.

16. The method of claim 12, wherein the computer-generated representation of the trackpad includes the selection point.

17. The method of claim 1, further comprising:
while displaying the content manipulation region and the computer-generated representation of the trackpad at the placement location on the physical surface, detecting a movement across the computer-generated representation of the trackpad;
and performing a content manipulation operation with respect to the content manipulation region based on the movement.

18. An electronic device comprising:
one or more processors;
a non-transitory memory;
an eye tracker;
a spatial selector tracker;
a display; and
one or more programs, wherein the one or more programs are stored in the non-transitory memory and configured to be executed by the one or more processors, the one or more programs including instructions for:
displaying a content manipulation region on the display, wherein the content manipulation region comprises less than the entirety of the display;
while displaying the content manipulation region on the display:
determining a first gaze position within the content manipulation region based on eye tracking data from the eye tracker;
determining a selection point associated with a physical surface, based on spatial selector data from the spatial selector tracker; and
displaying, on the display, a computer-generated representation of a trackpad at a placement location on the physical surface, wherein the placement location is based on the first gaze position and the selection point.

19. The electronic device of claim 18, the one or more programs including instructions for:
determining an offset position relative to the selection point, based on the first gaze position; and
setting the placement location to the offset position.

20. The electronic device of claim 19, wherein determining the offset position includes:
determining a first vector, within the content manipulation region, that intersects with the first gaze position; and
determining, based in part on the first vector, a second vector within the computer-generated representation of the trackpad, wherein the second vector intersects with the selection point.

21. A non-transitory computer readable storage medium storing one or more programs, the one or more programs comprising instructions, which, when executed by an electronic device with one or more processors, an eye tracker, a spatial selector tracker, and a display, cause the electronic device to:
displaying a content manipulation region on the display, wherein the content manipulation region comprises less than the entirety of the display;
while displaying the content manipulation region on the display:
determine a first gaze position within the content manipulation region based on eye tracking data from the eye tracker;
determine a selection point associated with a physical surface, based on spatial selector data from the spatial selector tracker; and
display, on the display, a computer-generated representation of a trackpad at a placement location on the physical surface, wherein the placement location is based on the first gaze position and the selection point.

* * * * *